(12) United States Patent
Tashiro et al.

(10) Patent No.: US 7,680,865 B2
(45) Date of Patent: Mar. 16, 2010

(54) IMAGE PROCESSING APPARATUS AND IMAGE PROCESSING METHOD

(75) Inventors: Hirohiko Tashiro, Kawasaki (JP); Satoshi Ookuma, Yokohama (JP); Kaori Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 557 days.

(21) Appl. No.: 11/267,672

(22) Filed: Nov. 4, 2005

(65) Prior Publication Data

US 2006/0101078 A1 May 11, 2006

(30) Foreign Application Priority Data

Nov. 9, 2004 (JP) ............................. 2004-325612

(51) Int. Cl.
*G06F 7/00* (2006.01)
*G06F 17/30* (2006.01)
*G06F 12/00* (2006.01)
*G06F 13/00* (2006.01)
*G06F 13/28* (2006.01)
*G06F 3/00* (2006.01)

(52) U.S. Cl. .................. 707/784; 711/121; 715/760

(58) Field of Classification Search .............. 709/220; 707/100, 9; 711/121; 715/760
See application file for complete search history.

(56) References Cited

U.S. PATENT DOCUMENTS 6,161,139 A * 12/2000 Win et al. .................. 709/225

2001/0052061 A1 * 12/2001 Fradette .................... 711/202
2002/0091803 A1    7/2002 Imamura
2005/0005131 A1 * 1/2005 Yoshida et al. ............ 713/183

FOREIGN PATENT DOCUMENTS

JP      11-316727      11/1999
JP      2000-006686    1/2000

* cited by examiner

*Primary Examiner*—James Trujillo
*Assistant Examiner*—Amresh Singh
(74) *Attorney, Agent, or Firm*—Cowan, Liebowitz & Latman, P.C.

(57) ABSTRACT

The present invention provides an image processing apparatus and an image processing method, which can improve security and reinforce privacy protection for cache data and management data generated when an operator employs a browser function, and which can efficiently utilize storage resources of the apparatus. In the image processing apparatus having a browser function, data generated by an operator employing the browser function is stored in the RAM. Herein, it is determined whether or not the operator employing the browser function is a particular operator such as a system administrator. In a case where the browser function is employed by an operator other than the particular operator, the data stored in the RAM is deleted. Meanwhile, in a case of the particular operator, the data is stored in a hard disk drive (HDD).

13 Claims, 21 Drawing Sheets

FIG. 9

- WHAT'S NEW -

- GENERAL INFORMATION ON 8/1

NEWS NO. 1

NEWS NO. 2

NEWS NO. 3

- GENERAL INFORMATION ON 7/31

NEWS NO. 1

NEWS NO. 2

NEWS NO. 3

1202

END

URL

MENU OFF

F I G. 13
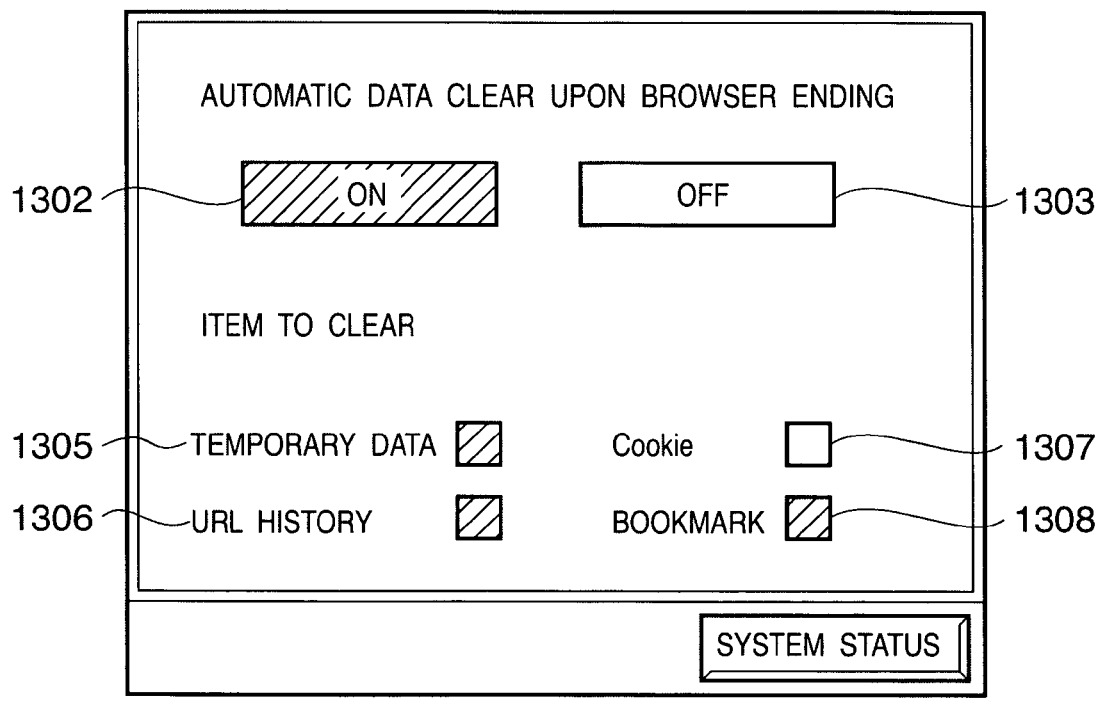

FIG. 15

BROWSER ACCESS HISTORY

| DATE | TIME | USER | URL |
|---|---|---|---|
| 2004/3/1 | 10:50 | User A | http://aaa.bbb.ccc.ddd |
| 2004/3/1 | 8:30 | User B | http://aaa.bbb.ccc.ddd |
| 2004/2/29 | 22:45 | Admin | http://aaa.bbb.ccc.ddd |
| 2004/2/29 | 21:30 | User C | http://aaa.bbb.ccc.ddd |

SYSTEM STATUS

IMAGE PROCESSING APPARATUS AND IMAGE PROCESSING METHOD

FIELD OF THE INVENTION

The present invention relates to an image processing apparatus such as a digital copying machine incorporating a browser function, a facsimile apparatus, a printer or the like, and an image processing method.

BACKGROUND OF THE INVENTION

Recent years have seen realization of mobile telephones, facsimile apparatuses and the like which incorporate a browser function. By this, it is possible to easily contrive providing a digital multi-function copying machine or a printer apparatus which incorporates a Web browser function inside the apparatus to perform browsing on an operation screen. By virtue of incorporating a Web browser function in the apparatus, it is possible on an operation screen of the digital multi-function copying machine to display and operate a Web application program working on a personal computer (PC) or a server connected to the apparatus, or to display and print a Web content on a network. Such art is disclosed in, e.g., Japanese Patent Application Laid-Open (KOKAI) No. 2000-6686.

Generally, in a Web browser on a personal computer, normally a management area is prepared for each user to manage a cache area for temporary data, and user data such as bookmarks or the like that are managed by the Web browser. When a user performs cache clear or history clear on the management screen of the Web browser, the cache area for temporary data and the history prepared for the user can be cleared.

However, in a digital multi-function copying machine, there is a case that more than 1000 department IDs are prepared to be used in user control. If a Web browser is incorporated to a digital multi-function copying machine, it is unrealistic to provide a management area for each of the department IDs under constraints of the capacity of the digital multi-function copying machine.

Meanwhile, there is an idea of sharing management data such as Cookie, URL history data and the like used in the browser function, and a cache area for temporarily storing contents. However, in general since a digital multi-function copying machine is often used by plural users, temporary data in a cache area and management data used before may remain in the apparatus when another user uses the apparatus. This involves security concerns and privacy protection issues.

Furthermore, a digital multi-function copying machine is often used without being managed by department IDs or without other user control. Particularly in an environment where the apparatus is used by unspecified number of users, e.g., convenience stores, user data of unspecified number of people remains in the digital multi-function copying machine, causing problems in view of security and privacy protection.

SUMMARY OF THE INVENTION

The present invention has been proposed in view of the above-described circumstance, and has as its object to provide an image processing apparatus and an image processing method, which can improve security and reinforce privacy protection for cache data and management data generated when an operator employs a browser function, and which can efficiently utilize storage resources of the apparatus.

In order to achieve the aforementioned object, the present invention provides an image processing apparatus having a browser function, comprising a storage unit, adapted to store in a predetermined storage device data generated by employing the browser function, a determination unit, adapted to determine whether or not the browser function is used by a predetermined operator and a deletion unit, adapted to delete at predetermined timing the data stored in the predetermined storage device, in a case where the browser function is used by an operator other than the predetermined operator.

Furthermore, in the above-described image processing apparatus, wherein the deletion unit deletes the data stored in the storage device at timing at which the operator other than the predetermined operator ends use of the browser function, or at timing at which a browser screen for executing the browser function shifts to another screen.

Furthermore, in the above-described image processing apparatus, wherein the storage unit stores in a first storage device data generated by employing the browser function by an operator, and in a case where the determination unit determines that the operator employing the browser function is a system administrator, the storage unit copies the data stored in the first storage device to a second storage device, and after the data is copied to the second storage device, the deletion unit deletes the data stored in the first storage device.

Furthermore, the above-described image processing apparatus further comprises a setting unit, adapted to perform setting for whether or not the data stored in the storage unit is to be deleted, wherein the deletion unit deletes the data in the storage device in a case where deletion of the data is set by the setting unit.

Furthermore, in the above-described image processing apparatus, wherein the data is management data for managing the browser function, and includes at least one of temporary data which is temporarily stored for displaying a content downloaded by the browser function, history data of URL accessed by using the browser function, Cookie data, and bookmark data.

Furthermore, the above-described image processing apparatus further comprises a selection unit, adapted to select one or plurality of data to be deleted from the data stored in the storage unit, wherein the deletion unit deletes, from the data stored in the storage device, only data where deletion is set by being selected by the selection unit.

Furthermore, in the above-described image processing apparatus, wherein the second storage device stores in a first storage area URL data for enabling browsing of a content again that has been browsed by the system administrator using the browser function, and stores in a second storage area data other than the URL data generated when the system administrator uses the browser function, and after the URL data is copied from the first storage device to the first storage area of the second storage device and the data other than the URL data is copied from the first storage device to the second storage area of the second storage device, the deletion unit deletes data stored in the first storage device.

Furthermore, the above-described image processing apparatus further comprises a browsing unit, adapted to perform browsing of a content based on data stored in the second storage device using the browser function, wherein a content based on the URL data stored in the second storage area is permitted for browsing only by a system administrator.

Furthermore, the above-described image processing apparatus further comprises a permission unit, adapted to permit whether or not to perform additional storage of the URL data to be copied from the first storage device to the first storage area of the second storage device, wherein only in a case where the permission unit permits additional storage, the storage unit stores the URL data from the first storage device to the first storage area of the second storage device.

Furthermore, the above-described image processing apparatus further comprises an authentication unit, adapted to authenticate a log-in operator for using the browser function, wherein the deletion unit deletes the data stored in the storage device at log-out timing of an operator authenticated by the authentication unit.

Furthermore, the above-described image processing apparatus further comprises an ID authentication unit, adapted to authenticate a log-in operator for using the browser function by using an authentication ID, an ID storage unit, adapted to store an authentication ID of an operator whose log-in is authenticated by the ID authentication unit and an ID determination unit, adapted to determine whether or not the authentication ID of the operator authenticated by the ID authentication unit matches an authentication ID of an operator last stored in the ID storage unit, wherein in a case where the operator authenticated by the ID authentication unit is different from the operator having the authentication ID last stored in the ID storage unit, the deletion unit deletes the data stored in the storage device at timing at which the operator employs the browser function.

Furthermore, in the above-described image processing apparatus, wherein the authentication unit authenticates an operator by using a department ID as an authentication ID, which is allocated to each department an operator belongs.

Furthermore, the above-described image processing apparatus further comprises an auto clear unit, adapted to clear various setting set in the apparatus and returns the setting to an initial setting state of the apparatus, in a case where it is determined that there is no use of the browser function by an operator for a predetermined period.

Furthermore, in the above-described image processing apparatus, wherein in a case where the determination unit determines at the time of browser startup or at the time of log-in to the apparatus that the operator employing the browser function is a system administrator, the storage unit copies the data stored in the first storage device to the second storage device, and the deletion unit deletes the data stored in the first storage device when the system administrator logs out.

Still further, in order to achieve the aforementioned object, the present invention provides an image processing method of an image processing apparatus having a browser function, comprising a storage step of storing in a predetermined storage device data generated by employing the browser function, a determination step of determining whether or not the browser function is used by a predetermined operator and a deletion step of deleting at predetermined timing the data stored in the predetermined storage device, in a case where the browser function is used by an operator other than the predetermined operator.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 9 is a view showing a screen displayed on the operation unit when a menu OFF key 1213 on the screen shown in FIG. 8 is depressed;

FIG. 13 is a view showing a screen for performing automatic data clear setting when the browser ends;

FIG. 15 is a view showing a screen for displaying a browser access history shifted from the screen shown in FIG. 14;

DETAILED DESCRIPTION OF THE PREFERRED EMBODIMENTS

Hereinafter, with reference to the drawings, detailed descriptions will be provided on image processing of an image processing apparatus incorporating a browser function according to an embodiment of the present invention, taking a digital multi-function copying machine (multi-function apparatus) as an example.

First Embodiment

Figure 1:
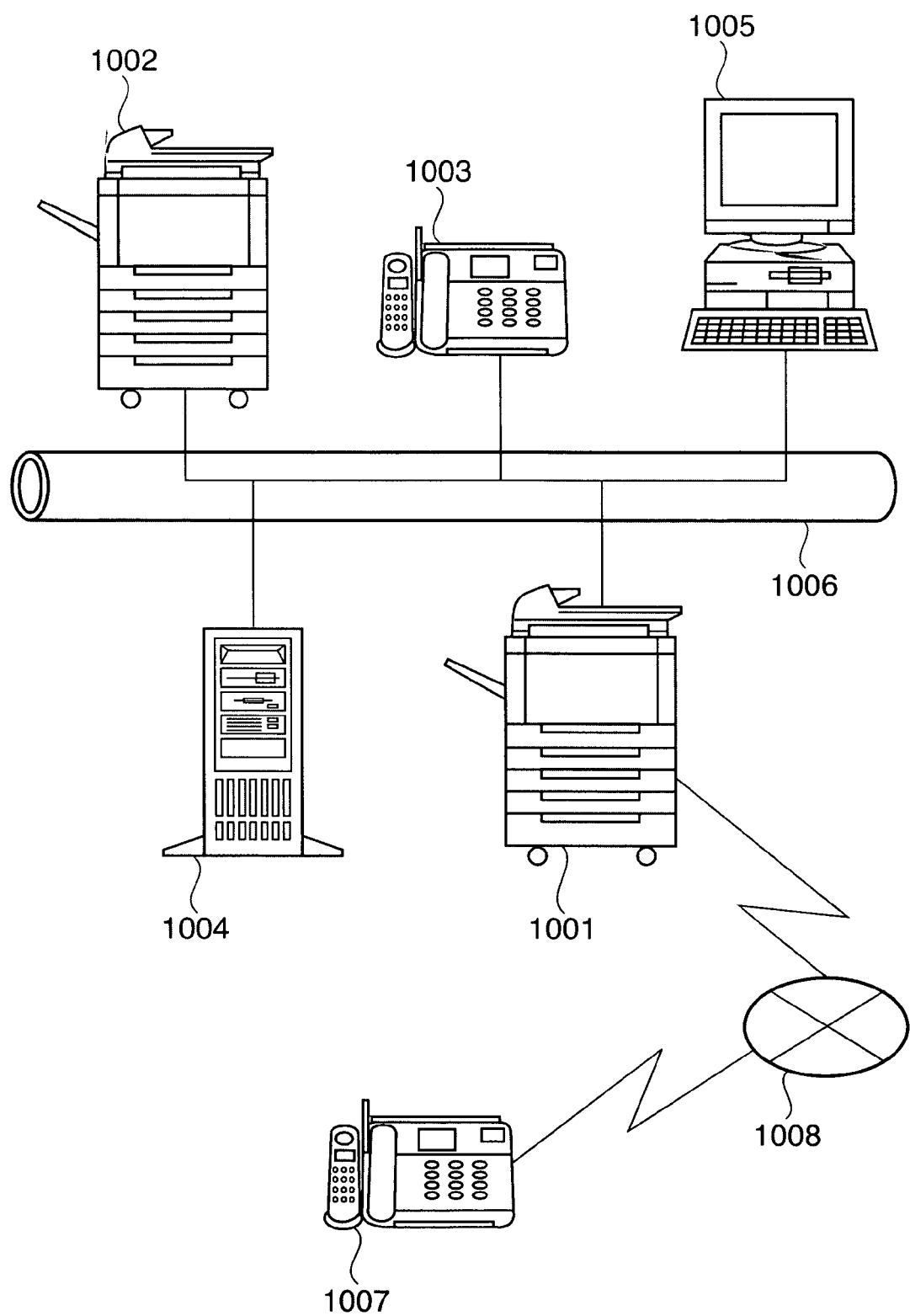
FIG. 1 is a brief diagram showing a construction of a network system including a multi-function apparatus according to the first embodiment of the present invention.

FIG. 1 is a brief diagram showing a construction of a network system including a multi-function apparatus according to the first embodiment of the present invention. Note that the multi-function apparatus described in the present embodiment refers to a copying machine (digital multi-function copying machine) having a data transmission/reception function.

As shown in FIG. 1, a copying machine 1001 is connected to (contained in) a copying machine 1002 having the same or substantially same function as the copying machine 1001, a facsimile apparatus 1003, a database/mail server 1004, a client computer 1005, and a LAN 1006 such as an Ethernet (registered trademark). Moreover, the copying machine 1001 is connected to (contained in) a facsimile apparatus 1007 through a public line 1008.

The copying machine 1001 has a copying function, a facsimile function, and a data transmission function that reads an original document image and transmits the read image data to respective apparatuses on the LAN 1006. Also, the copying machine 1001 has a Page Description Language (PDL) function so that it can receive and print a PDL image designated by a computer connected to the LAN 1006. The copying machine 1001 can store an image read by the copying machine 1001 or a PDL image received from another computer or the like connected to the LAN 1006 in a designated box area of a hard disk 2004 (FIG. 2) of the copying machine 1001. The copying machine 1001 can also print the image stored in the box area.

The copying machine 1001 can receive data read by the copying machine 1002 through the LAN 1006, store the received data in the hard disk (HDD) 2004 of the copying machine 1001, and perform printing. Furthermore, the copying machine 1001 can receive an image from the database/mail server 1004 through the client computer 1005 or the LAN 1006, store the image in the copying machine 1001, and perform printing. The facsimile apparatus 1003 can receive data read by the copying machine 1001 through the LAN 1006, and transmit the received data.

The database/mail server 1004 is a server which has a function for receiving data read by the copying machine 1001 through the LAN 1006, storing the received data as a database, and transmitting the data as an electronic mail.

The client computer 1005 is connected to the database/mail server 1004, thereby acquiring and displaying desired data from the database/mail server 1004. The client computer 1005 can receive data read by the copying machine 1001 through the LAN 1006, manipulate and edit the data.

The facsimile apparatus 1007 can receive data read by the copying machine 1001 through the public line 1008, and print the received data.

Figure 2:
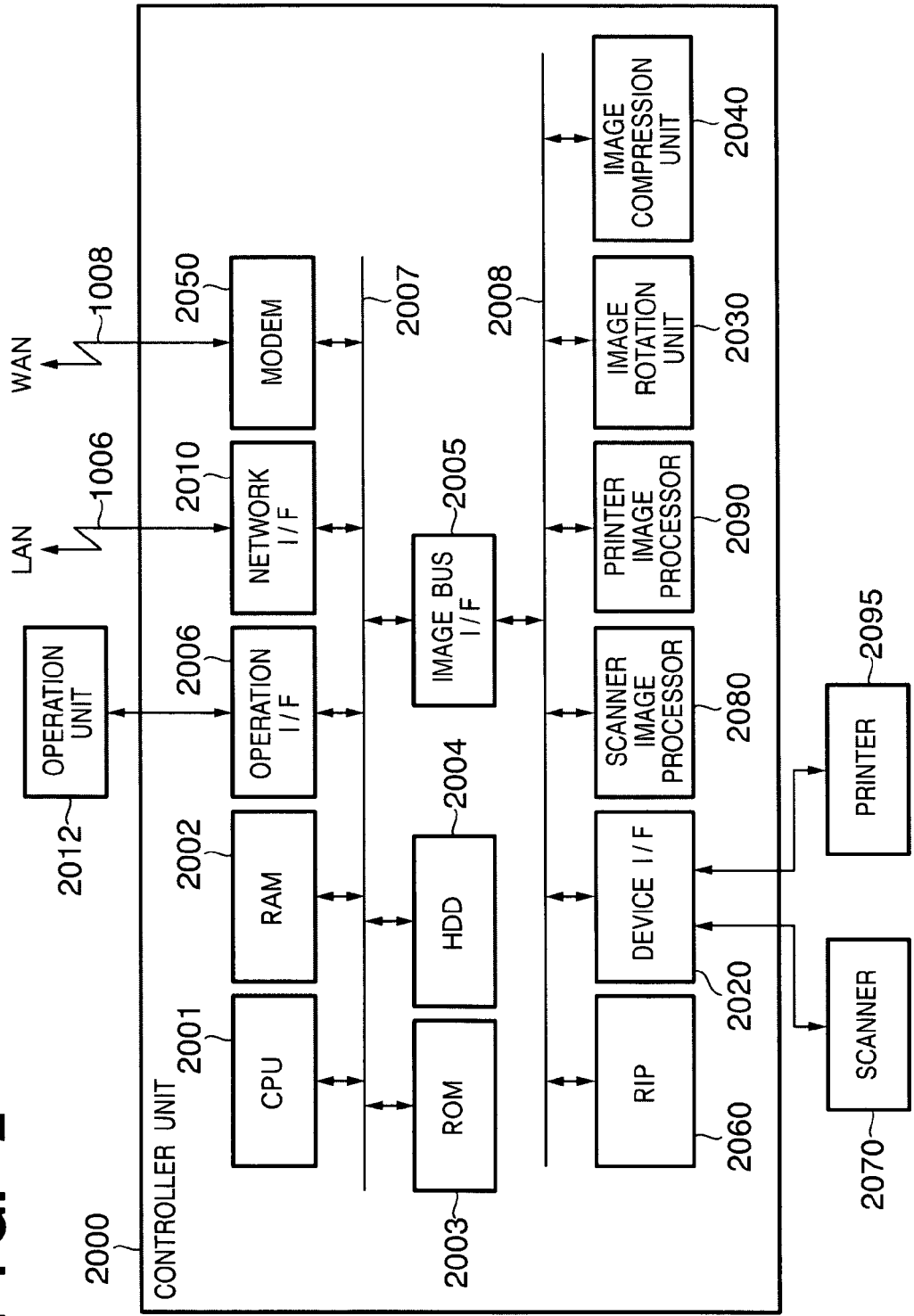
FIG. 2 is a block diagram showing a construction of a main unit of a copying machine 1001.

FIG. 2 is a block diagram showing a construction of a main unit of the copying machine 1001. As shown in FIG. 2, the copying machine 1001 has a controller unit 2000. To the controller unit 2000, a scanner 2070 serving as an image input device and a printer 2095 serving as an image output device, as well as an operation unit 2012 are connected. The controller unit 2000 performs control for realizing a copying function in which the printer 2095 prints the image data read by the scanner 2070. Further, the controller unit 2000 is connected to the LAN 1006 and the public line 1008 (WAN), thereby performing control for inputting/outputting image data and device data.

The controller unit 2000 comprises a CPU 2001. The CPU 2001 starts up an operating system (OS) by a boot program stored in a ROM 2003, and executes an application program stored in the hard disk drive (HDD) 2004 on the OS, thereby carrying out various processing. For a working area of the CPU 2001, a RAM 2002 is used. The RAM 2002 provides a working area and an image memory area for temporarily storing image data. The HDD 2004 stores the aforementioned application program and image data.

Meanwhile, the ROM 2003, the RAM 2002, an operation unit interface (I/F) 2006, a network interface (I/F) 2010, a modem 2050, and an image bus interface (I/F) 2005 are connected to the CPU 2001 through a system bus 2007.

The operation unit I/F 2006 is an interface of the operation unit 2012 having a touch panel. It outputs to the operation unit 2012 image data to be displayed on the operation unit 2012. Further, the operation unit I/F 2006 outputs to the CPU 2001 data inputted by a user on the operation unit 2012.

The network I/F 2010 is connected to the LAN 1006 for inputting/outputting data between the LAN 1006 and respective devices on the LAN 1006. The modem 2050 is connected to the public line 1008 for inputting/outputting data through the public line 1008.

The image bus I/F 2005, connecting the system bus 2007 with an image bus 2008 which transfers image data at high speed, serves as a bus bridge for converting a data form. The image bus 2008 is configured with a PCI bus or IEEE 1394. Provided on the image bus 2008 are a raster image processor (RIP) 2060, a device I/F 2020, a scanner image processor 2080, a printer image processor 2090, an image rotation unit 2030, and an image compression unit 2040.

The RIP 2060 is a processor for developing PDL codes to a bitmap image. The device I/F 2020, to which the scanner 2070 and the printer 2095 are connected, performs synchronous/asynchronous conversion of image data. The scanner image processor 2080 performs correction, manipulation and editing on inputted image data. The printer image processor 2090 performs correction, resolution conversion and the like corresponding to the printer 2095 on printed image data. The image rotation nit 2030 performs rotation of image data. The image compression unit 2040 performs compression of multi-valued image data to JPEG data, or binary image data to JBIG, MMR, MH data or the like, and performs decompression of the data.

Figure 3:
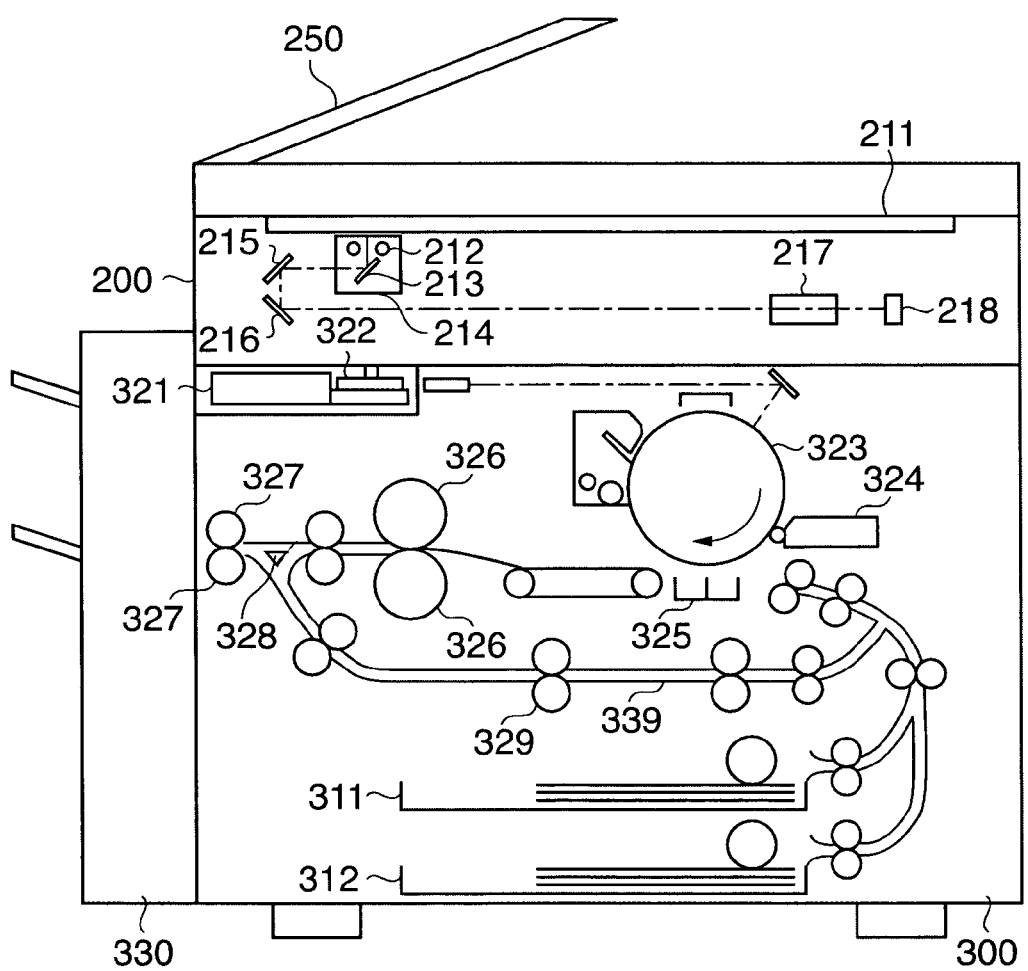
FIG. 3 is a sectional side view showing a hardware construction of a scanner 2070 and a printer 2095 shown in FIG. 2.

Next, the hardware construction of the scanner 2070 and the printer 2095 will be described with reference to FIG. 3. FIG. 3 is a sectional side view showing the hardware construction of the scanner 2070 and the printer 2095 in FIG. 2.

The scanner 2070 and the printer 2095 are integrally constructed as shown in FIG. 3. The scanner 2070 comprises an original document feeding unit 250 which sequentially feeds an original document to a platen glass 211 one by one from the beginning of the original document. Each time a reading operation of each document is completed, the document is discharged from the platen glass 211 to a discharge tray (not shown).

When the original document is fed to the platen glass 211, the scanner 2070 turns on a lamp 212 and starts motion of a moving unit 213. By the motion of the moving unit 213, scanning and reading of the original document on the platen glass 211 are performed. During the scanning, reflected light from the original document is led to a CCD image sensor 218 (hereinafter referred to as a CCD) through respective mirrors 214, 215, and 216 as well as a lens 217, and an image of the original document is formed on the image forming surface of the CCD 218. The CCD 218 converts the image formed on the image forming surface to an electric signal. After the electric signal is subjected to predetermined processing, it is inputted to a control device (not shown).

The printer 2095, corresponding to a printer unit 300, comprises a laser driver 321. The laser driver 321 drives a laser emission unit 322 based on the image data inputted from the control device. As a result, a laser beam corresponding to the image data is emitted from the laser emission unit 322, and irradiated on a photosensitive drum 323 while being scanned. On the photosensitive drum 323, an electrostatic latent image is formed by the irradiated laser beam. The electrostatic latent image is visualized as a toner image by the toner supplied from a developer 324. In synchronization with the laser beam irradiating timing, a printing sheet is conveyed from one of the cassettes 311 and 312 through a conveyance path to a space between the photosensitive drum 323 and a transfer unit 325. The toner image on the photosensitive drum 323 is transferred to the printing sheet by the transfer unit 325.

The printing sheet, to which the toner image is transferred, is sent to a pair of fixing rollers 326 (a heating roller and a pressuring roller) through a conveyance belt. The pair of fixing rollers 326 pressures the printing sheet with heat to fix the toner image on the printing sheet. The printing sheet that has gone through the pair of fixing rollers 326 is discharged to a discharge unit 330 by a pair of discharge rollers 327. The discharge unit 330 is configured with a sheet processing device capable of post-processing, e.g., sorting, stapling and the like.

In a case where a double-face printing mode is set, the printing sheet is conveyed to the pair of discharge rollers 327, thereafter the rotation direction of the pair of discharge rollers 327 is reversed to lead the printing paper to a re-feeding conveyance path 339 using a flapper 328. The printing paper led to the re-feeding conveyance path 339 is fed again to the space between the photosensitive drum 323 and the transfer unit 325 at the above-described timing, and a toner image is transferred on the back face of the printing sheet.

Figure 4:
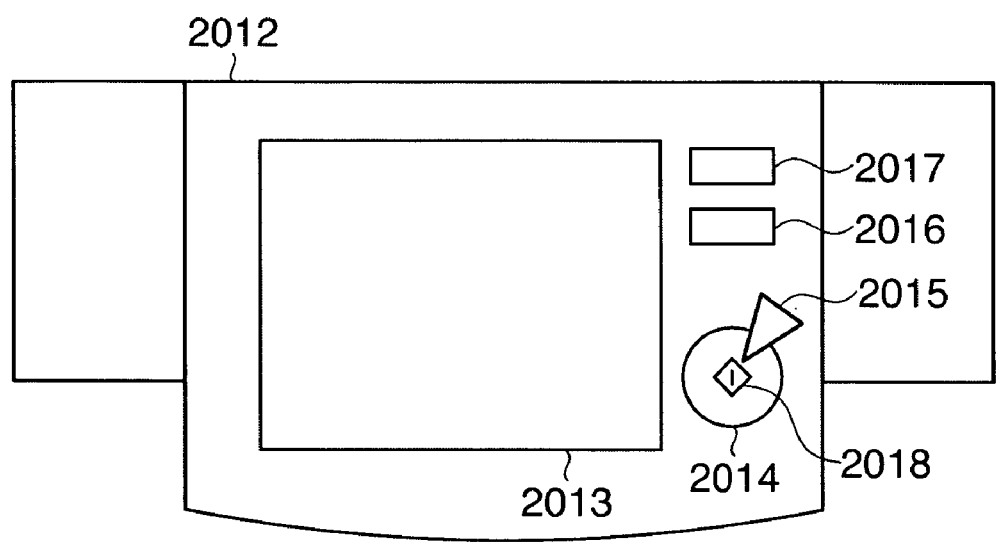
FIG. 4 is a top view showing an external configuration of an operation unit 2012 shown in FIG. 2.

FIG. 4 is a top view showing an external configuration of the operation unit 2012 shown in FIG. 2. An LCD unit 2013 shown in FIG. 4 has a touch panel sheet laminated on the LCD. The LCD 2013 displays an operation screen of the copying machine 1001, and also transmits position information of a key to the CPU 2001 of the controller unit 2000 when a key is depressed on the screen. A start key 2014 is used to start a reading operation of an original document image. In the center of the start key 2014, a two-color LED 2018 having green and red is provided to indicate whether or not the start key 2014 is available for use. A stop key 2015 is operated to stop an operation in progress. An ID key 2016 is used to input a user ID. A reset key 2017 is used to initialize the setting on the operation unit 2012.

Figure 5:
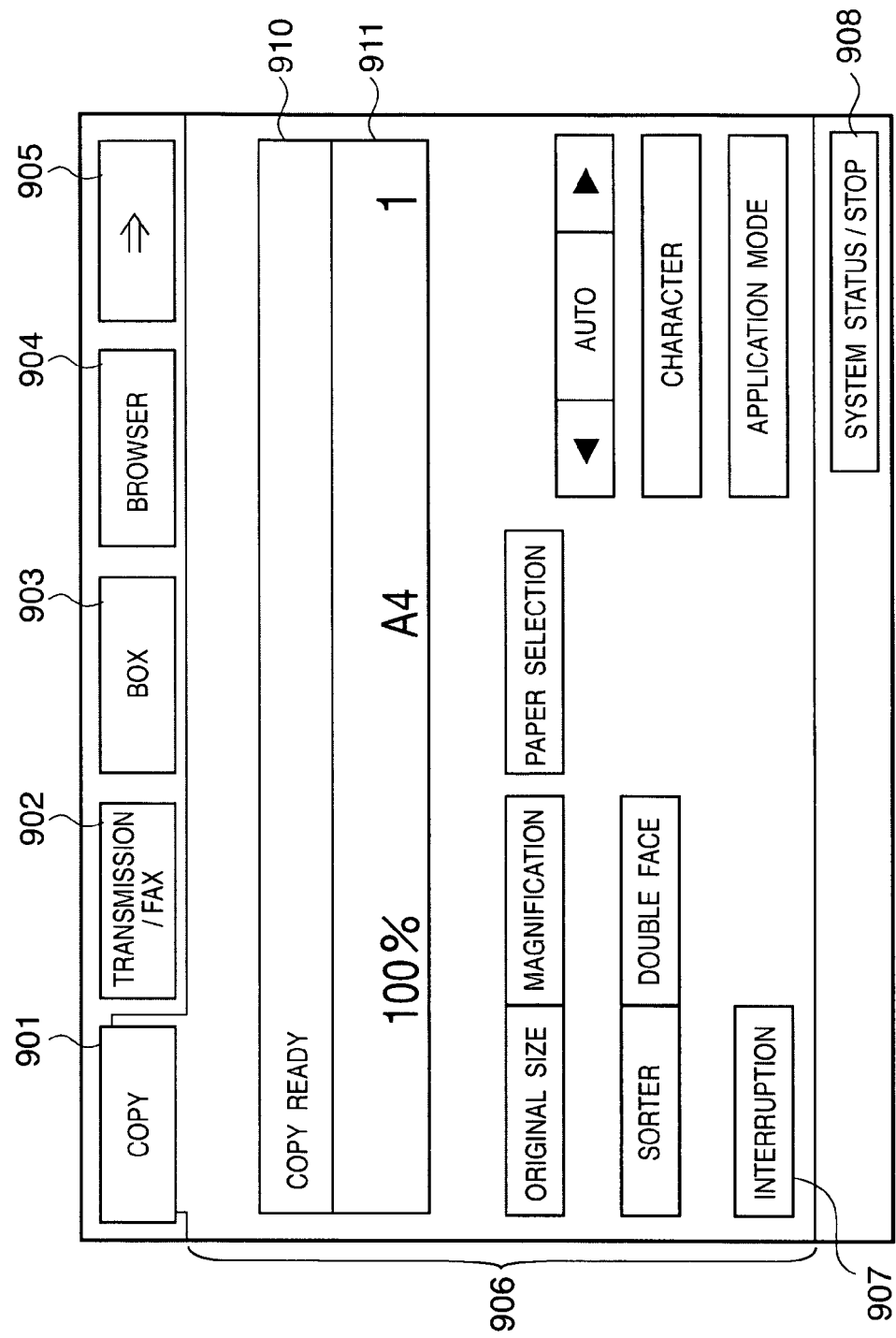
FIG. 5 is a view showing an example of an operation screen displayed on an LCD unit 2013 of the operation unit 2012.

FIG. 5 shows an example of an operation screen displayed on the LCD unit 2013 of the operation unit 2012. Displayed on the upper portion of the operation screen of the operation unit 2012 are touch keys including a copy tab 901, a transmission/FAX tab 902, a box tab 903, a browser tab 904, and a right arrow tab 905 for selecting various functions.

Shown in FIG. 5 is an initial screen of a copying function which is displayed when the touch key of the copy tab 901 is depressed. The area 906 displays information regarding the copying function. For instance, the area 910 where "copy ready" is displayed in the area 906 indicates the status of the copying function. The area 911 below the area 910 indicates a magnification, a selected paper-feed tray, and a numeric value. The touch keys for setting an operation mode of the copying function includes an original-size key, a magnification key, a paper selection key, a sorter key, a double-face key, an interruption key, a character key, a left arrow key corresponding to "lightening" for adjusting density, a right arrow key corresponding to "darkening," and an automatic key for automatically adjusting density. Furthermore, by depressing an application mode key, an operation-mode designation screen that cannot be displayed on the initial screen is hierarchically displayed in the area 906.

The display area 907 is an area displaying the status of the copying machine 1001. For instance, the area displays an alarm message such as paper jam, and a status message indicative of PDL printing in progress when PDL printing is performed. In the display area 907, a system status/stop touch key 908 is displayed. When the system status/stop touch key 908 is depressed, a screen displaying device information of the copying machine 1001 or a screen (not shown) displaying a print job status is displayed. On this screen, job termination can be performed.

Furthermore, when the transmission/FAX tab 902 is depressed, a setting screen (not shown) is displayed for e-mail transmission or FTP transmission of an image read by the copying machine 1001 to an apparatus connected to the LAN 1006, or for facsimile transmission using the public line 1008.

When the box tab 903 is depressed, a setting screen (not shown) is displayed for storing an image read by the copying machine 1001 in a box area of the HDD 2004, designating and printing image data stored in the box area, or transmitting the data to an apparatus connected to the LAN 1006.

In a case where the controller unit 2000 comprises five or more functions, a right arrow key 905 is displayed on the right side of the four function tabs 901 to 904 (copy, transmission/FAX, box, and browser). When the right arrow key 905 is depressed, a tab for another function is displayed (e.g., the tabs are shifted one by one). Note in the present embodiment, although five function tabs are displayed as shown in FIG. 5 and one of them is used as a switch indication, the number of function tabs that are simultaneously displayed is not limited to this.

Figure 6:
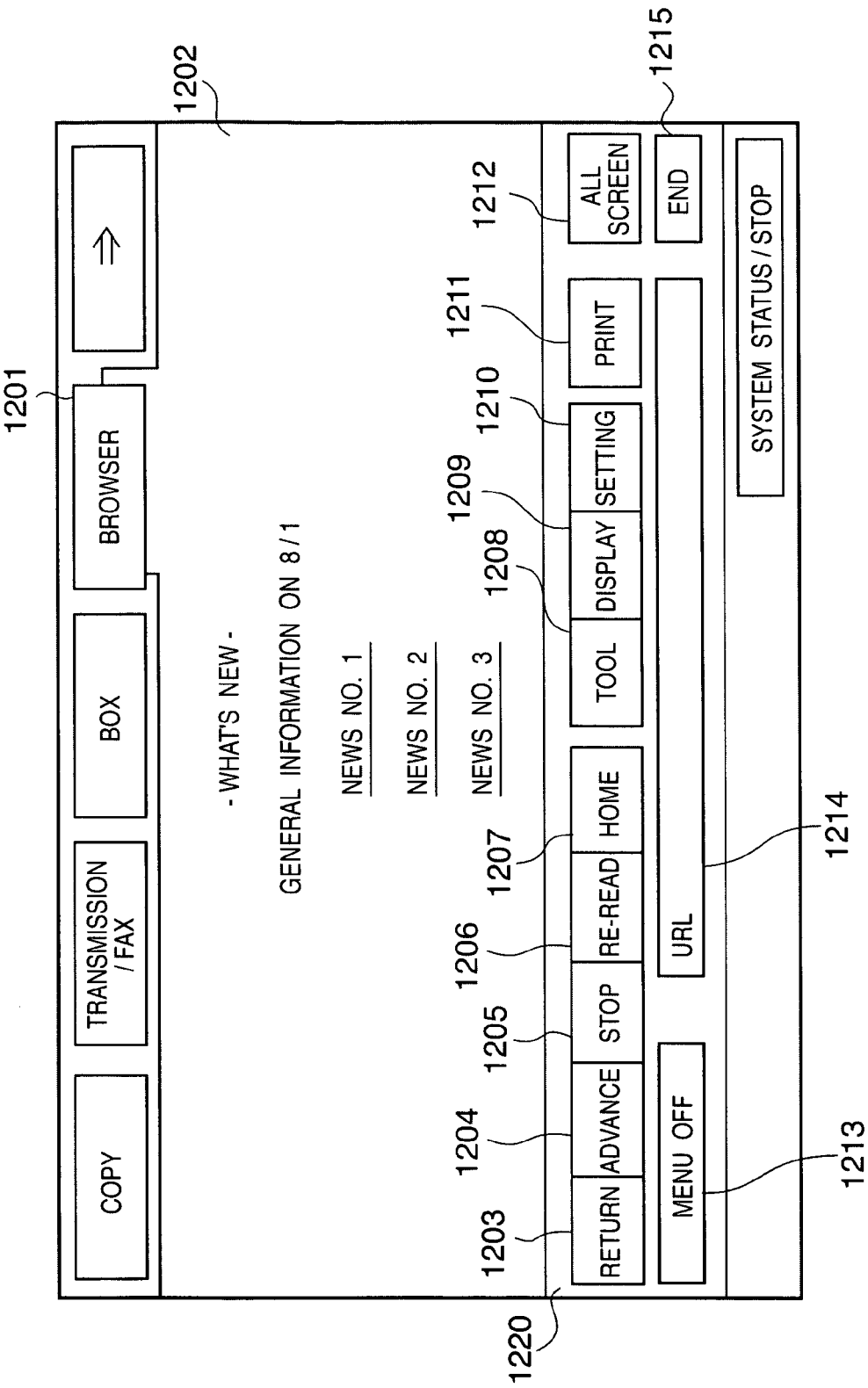
FIG. 6 is a view showing a screen displayed on the operation unit when a browser tab 904 is depressed on the operation screen shown in FIG. 5.

Next, browser displaying on the operation unit 2012 is described. The ROM 2003 of the controller unit 2000 incorporates a program for Web browser displaying so that it is possible to perform Web browser displaying according to user's designation through the operation unit 2012. More specifically, when the browser tab 904 in FIG. 5 is depressed, the screen displayed on the operation unit 2012 shifts to a browser screen shown in FIG. 6. FIG. 6 shows a screen displayed on the operation unit when the browser tab 904 is depressed on the operation screen in FIG. 5.

In the browser screen in FIG. 6, numeral 1220 is a menu display area 1220 for a browser operation, and numeral 1202 is a display area for displaying downloaded contents or the like. A return key 1203 is a key for returning a page to a previous page. An advance key 1204 is a key for advancing a page to a next page. A stop key 1205 is a key for stopping page reading. A re-reading key 1206 is a key for downloading a currently displayed page and displaying once again. A home key 1207 is a key for moving to a home page that has been set. A tool key 1208 is a key for displaying a tool screen, e.g., bookmarks, history, page storage and so on. A display key 1209 is a key for displaying a screen where a screen display magnification, a character size, a character code and so on are changed.

A setting key 1210 is a key for displaying a screen where the setting necessary for browsing is performed, e.g., proxy setting, security setting or the like. In the setting screen, temporary data, URL history data, bookmarks, Cookie data can be cleared according to user's designation. When clear designation is made, the corresponding data area of the work area 1601 where data is stored, which will be described later, is cleared. A print key 1211 is a key for displaying a currently displayed page. When the print key 1211 is depressed, a print setting dialogue is displayed. In the print setting dialogue, a screen is displayed for setting how to print a frame and for making printing-related setting (number of copies, double face, sorting and so on). When a print start button on the screen is depressed, printing is started.

An all-screen key 1212 is a key for displaying the browser on the entire screen. This will be described later. A menu OFF key 1213 is a key for turning off the menu screen comprising the aforementioned return key 1203, the advance key 1204, the stop key 1205, the re-reading key 1206, the home key 1207, the tool key 1208, the display key 1209, the setting key 1210, the print key 1211, and the all-screen key 1212.

Figure 7:
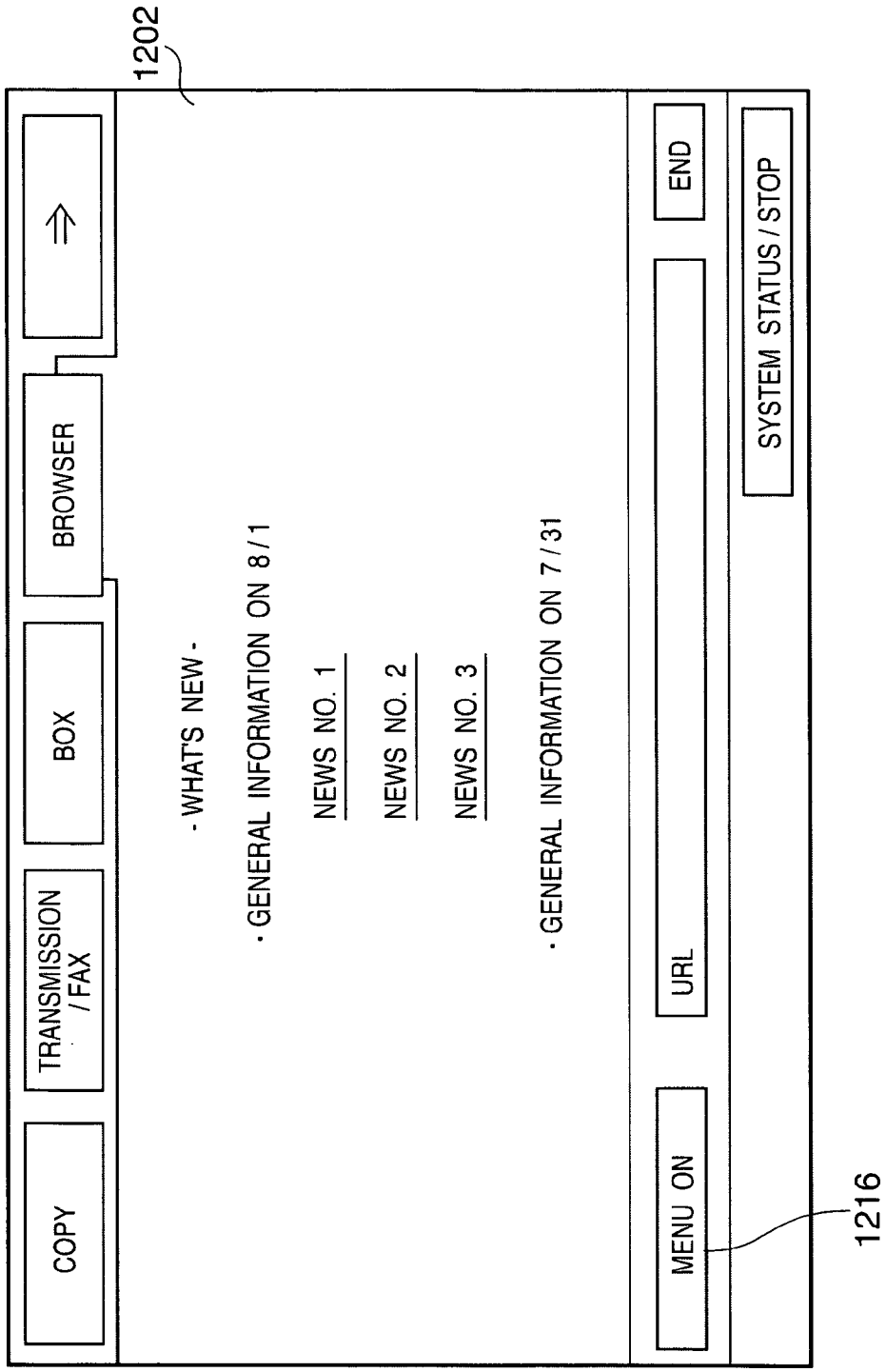
FIG. 7 is a view showing a screen displayed on the operation unit 2012 when a menu OFF key on the screen shown in FIG. 6 is depressed.

When the menu OFF key 1213 is depressed, the screen displayed on the operation unit 2012 is changed to the screen shown in FIG. 7 and the menu screen disappears. Instead, part of the contents that is not shown in the screen of FIG. 6 can be displayed. More specifically, FIG. 7 shows a screen displayed on the operation unit 2012 when the menu OFF key on the screen shown in FIG. 6 is depressed. In place of the display position of the menu OFF key 1213, a menu ON key 1216 is displayed. When the menu ON key 1216 is depressed, the menu screen is displayed again, switching to the screen shown in FIG. 6.

A URL input portion 1214 is operated when a user wants to designate a URL to open a corresponding page. When the user depresses this field, a soft keyboard is displayed for URL designation. An end key 1215 is a key for ending the browser screen. When this key is depressed, the URL of a screen to be displayed returns to a URL that has been set as a home screen, and an initial screen prior to browser function is displayed.

Figure 8:
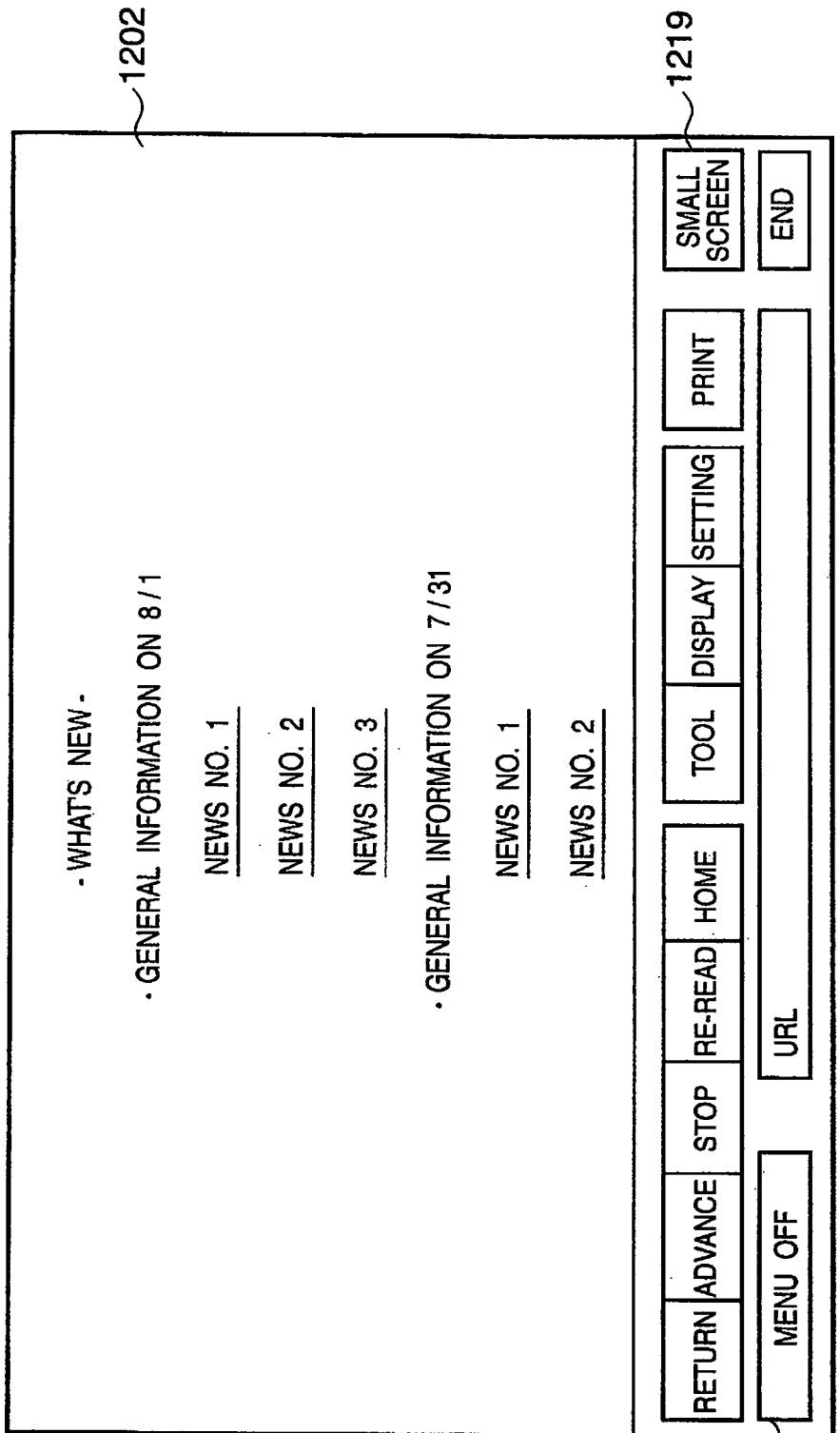
FIG. 8 is a view showing a screen displayed on the operation unit 2012 when an all screen key 1212 on the screen shown in FIG. 6 is depressed.

FIG. 8 shows a screen displayed on the operation unit 2012 when the all screen key 1212 on the screen in FIG. 6 is depressed. More specifically, in the screen shown in FIG. 8, respective function tabs at the top part of the screen in FIG. 6, the status indication at the bottom part, and the system status/stop key 908 are erased, and the menu OFF key 1213, the URL input portion 1214, and the end key 1215 are moved to the bottom part of the screen. As a result, the menu display area is reduced, enlarging the content display area 1202.

A small screen key 1219 is a key for returning the screen in FIG. 8 to the screen in FIG. 6 on the operation unit 2012. When the key 1219 is depressed, the function tabs, the status indication, and the system status/stop key 908 are displayed again, and the content display area 1202 is reduced. When the menu OFF key 1213 is depressed on the screen in FIG. 8, the screen displayed on the operation unit 2012 is shifted to the screen shown in FIG. 9, erasing the part where the menu keys are displayed and further enlarging the content display area 1202. FIG. 9 shows a screen displayed on the operation unit when the menu OFF key 1213 on the screen shown in FIG. 8 is depressed.

Figure 10:
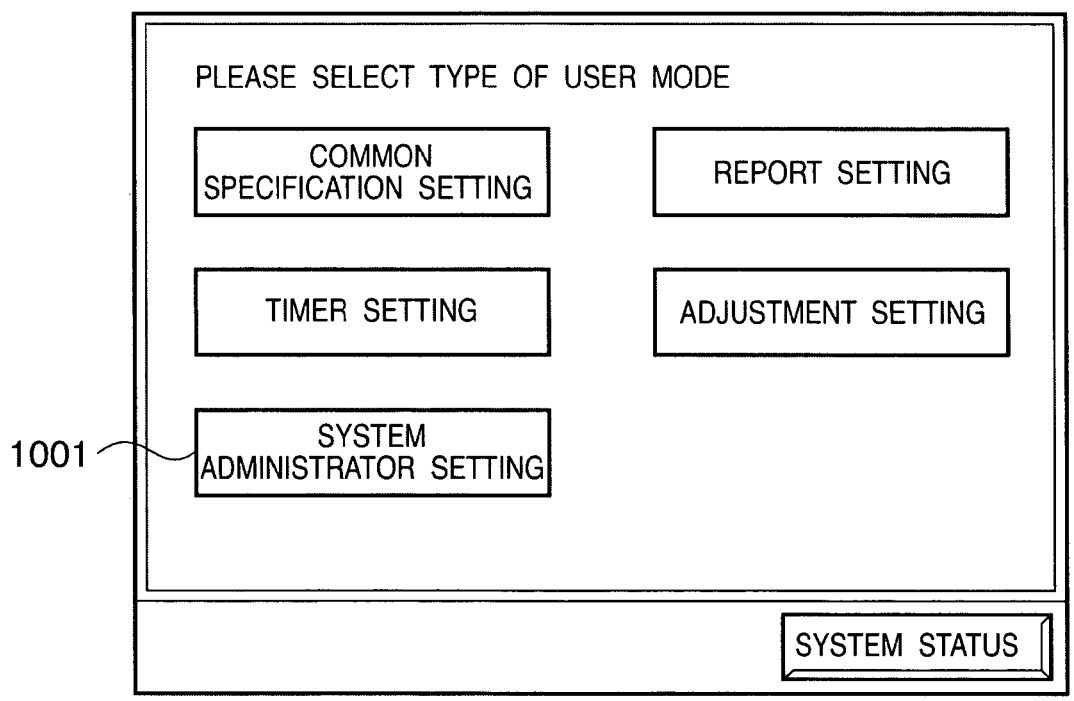
FIG. 10 is a view showing a screen for selecting a user mode type displayed when a user mode key on the operation unit 2012 is depressed.
Figure 11:
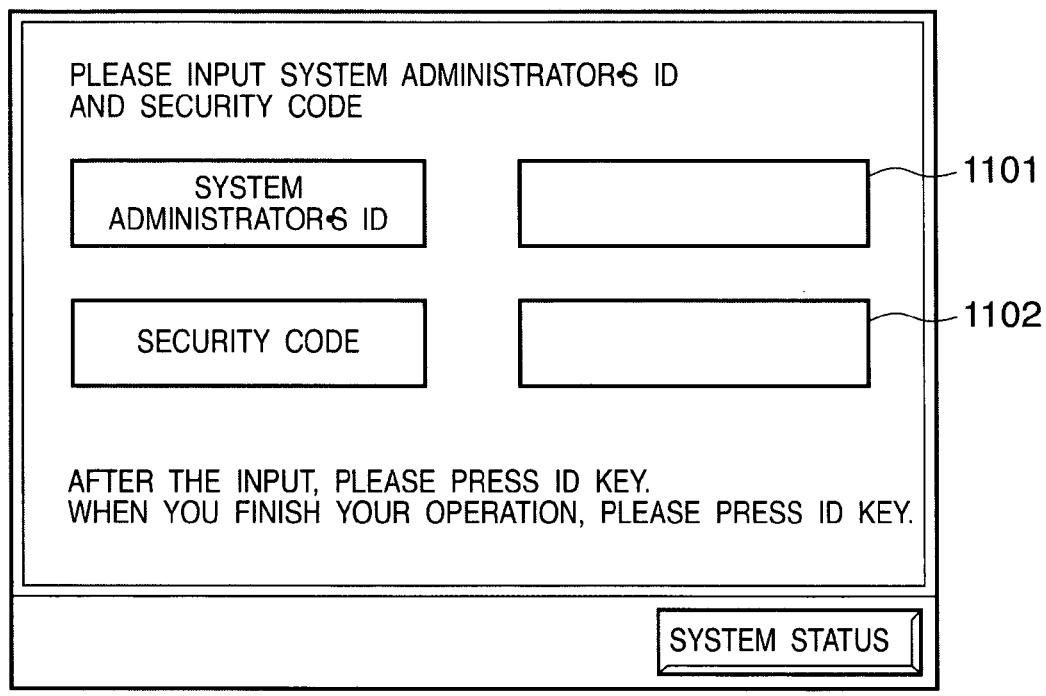
FIG. 11 is a view showing a screen for inputting a system administrator's ID and a security code.

Next, a browser setting screen according to the present embodiment is described. FIG. 10 shows a screen for selecting a user mode type displayed when a user mode key (not shown) on the operation unit 2012 is depressed. Assume herein that the system administrator setting has already been registered. When a system administrator setting key 1001 is depressed, a screen shown in FIG. 11 is displayed for inputting a system administrator's ID and a security code. FIG. 11 shows a screen for inputting a system administrator's ID and a security code.

Figure 12:
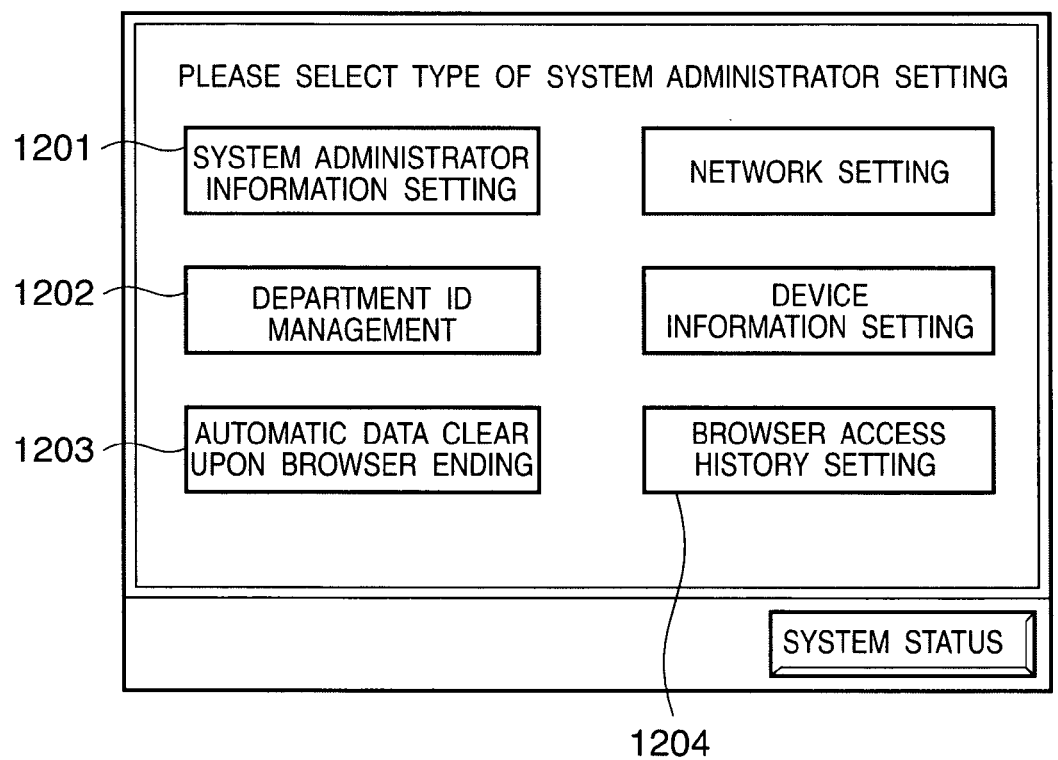
FIG. 12 is a view showing a screen for selecting a type of system administrator setting.

On the screen in FIG. 11, a system administrator's ID is inputted to the input field 1101 and a security code is inputted to the input field 1102, then the ID key 2016 is depressed on the operation unit 2012, thereby authenticating the system administrator. When the system administrator is correctly authenticated, a screen shown in FIG. 12 is displayed for selecting a type of system administrator setting. More specifically, FIG. 12 shows a screen for selecting a type of system administrator setting. Note that the present embodiment assumes that the system administrator setting has already been registered. However, setting and cancellation of the system administrator's ID and security code can be performed on a screen (not shown) displayed when a system administrator information setting key 1251 is depressed.

When an automatic clear key 1253 upon browser ending in FIG. 12 is depressed, a screen shown in FIG. 13 is displayed for performing automatic data clear setting upon browser ending. More specifically, FIG. 13 shows a screen for performing automatic data clear setting when the browser ends. When a user depresses an ON key 1302 on the screen in FIG. 13, automatic data clear setting is turned ON. When a user depresses an OFF key 1303, automatic data clear setting is turned OFF. Note that the selected key is highlighted. FIG. 13 shows that ON is selected.

When the ON key 1302 is selected and the automatic data clear is activated, items to be cleared become effective. With respect to the temporary data 1305, URL history data 1306, Cookie 1307, and bookmark 1308, whether or not to be cleared can be selected and designated. In FIG. 13, highlighted buttons indicate the items to be cleared. In this setting, temporary data, URL history data, and Cookie are to be cleared.

Herein, temporary data means data used in the cache function of a browser. Page data accessed once is temporarily stored by the cache function, and when the same page is displayed next, the page is displayed not through the network but the temporary stored data is displayed, thereby achieving quick displaying. The URL history data means history data of an URL accessed by using the browser function. Cookie is data recording information regarding the user, the date and time the user last visited the site, the number of times the user visited the site, and so forth. The bookmark is URL data registered by the user.

Figure 14:
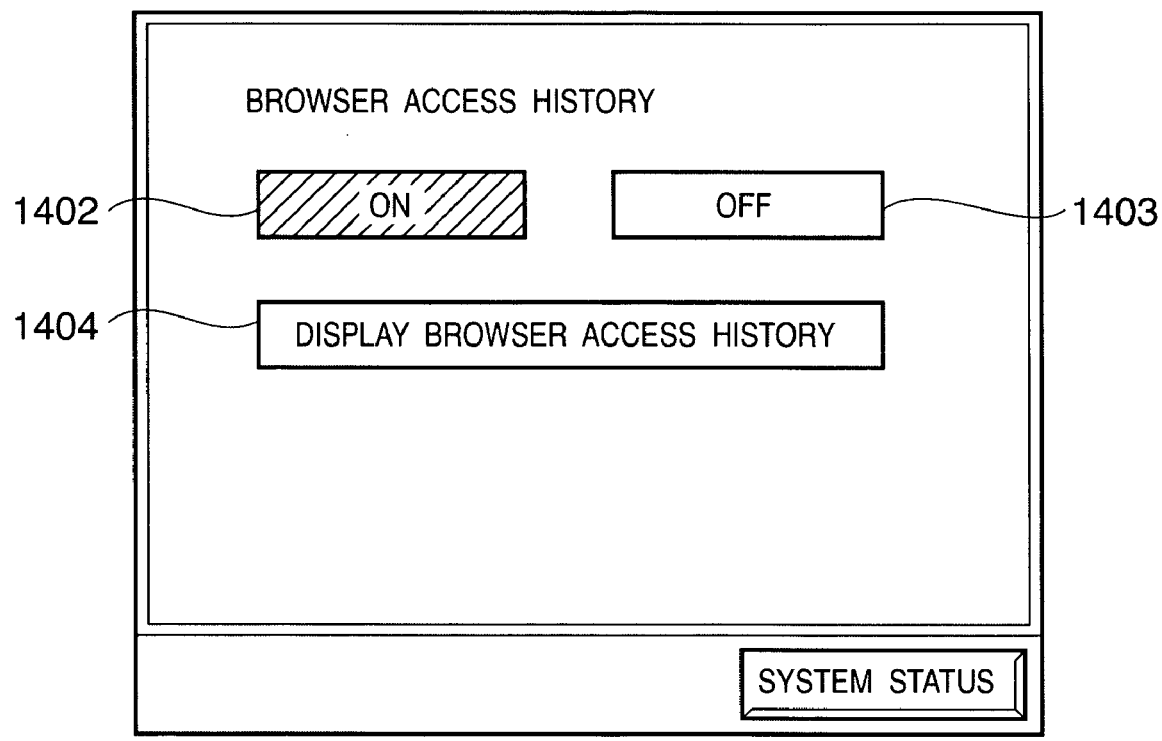
FIG. 14 is a view showing a screen for selecting whether or not to store a browser access history.

Next, when a browser access history key 1254 is depressed on the screen shown in FIG. 12, a screen shown in FIG. 14 is displayed. FIG. 14 shows a screen for selecting whether or not to store a browser access history. When a user depresses an ON Key 1402 on the screen in FIG. 14, setting is made to store the browser access history. When a user depresses an OFF key 1403, setting is made not to store the browser access history.

When a user depresses a browser access history display key 1404, the screen shifts to the screen in FIG. 15. FIG. 15 shows a screen for displaying a browser access history shifted from the screen shown in FIG. 14. On the screen in FIG. 15, a list of accessed date and time, an access user name, an accessed URL and so on is displayed.

Figure 16:
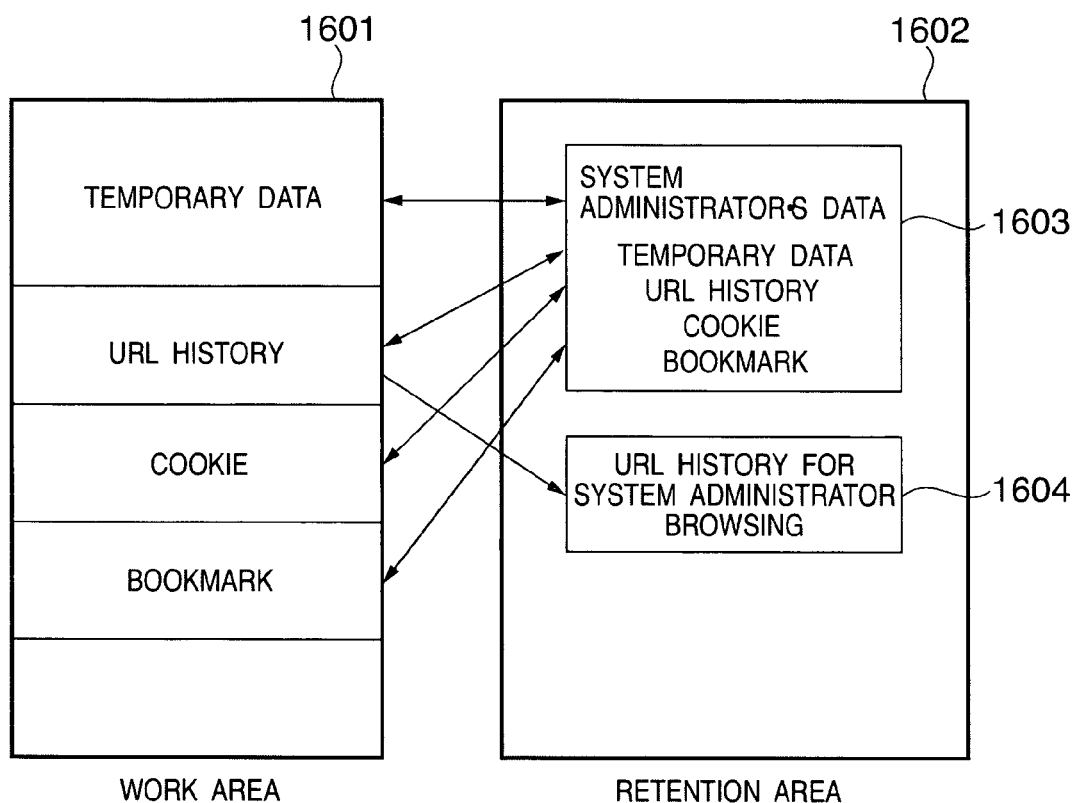
FIG. 16 is a conceptual view of user data used for browser displaying in the first embodiment.

FIG. 16 is a conceptual view of user data used for browser displaying in the first embodiment. Herein, user data includes the aforementioned temporary data, URL history data, Cookie, bookmarks and so on. A work area 1601 in FIG. 16 is a data area in the RAM 2002. In this work area, temporary data, URL history data, Cookie, and bookmarks are arranged. A retention area 1602 is provided as a file in the HDD 2004. System administrator's data 1603 is separated from URL history data 1604 provided for system administrator browsing.

Figure 17:
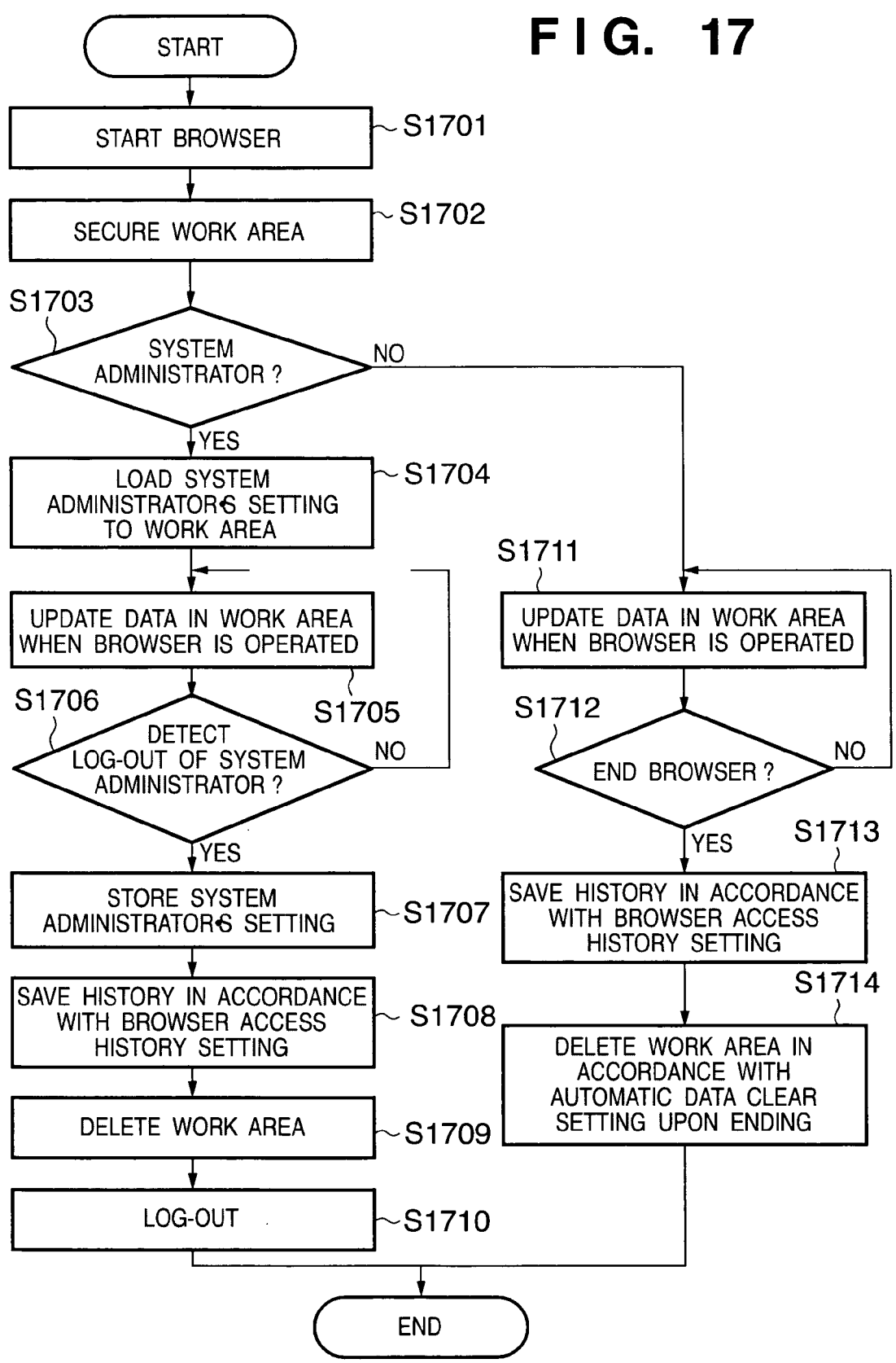
FIG. 17 is a flowchart describing processing for managing user data which is employed in browser displaying according to the first embodiment.

FIG. 17 is a flowchart describing processing for managing user data which is employed in browser displaying according to the first embodiment. First, when the browser tab 904 in the operation unit 2012 detects depression, a browser is started to begin a browser screen (step S1701). Next, a work area 1601 is secured in the RAM 2002 (step S1702). In the secured work area 1602, temporary data, URL history data, Cookie, bookmarks are separately managed.

Next, it is determined whether or not a current user is a system administration user (step S1703). As a result, if the user is determined as a system administration user (Yes), the temporary data, URL history data, Cookie and bookmarks, which are the data in the system administrator's data 1603 of the retention area 1602 are loaded and overwritten in the corresponding areas of the temporary data, URL history data, Cookie, and bookmarks in the work area 1601 (step S1704).

When the browser is operated and the temporary data, URL history data, Cookie and bookmarks are updated, respective data of the respective areas in the work area 1601 are updated (step S1705). For instance, as URL history data, an accessed URL, accessed date and time, an access user name and the like are stored.

Next, it is determined whether or not the system administrator user has logged out (step S1706). As a result, if the system administrator user has logged out (Yes), the temporary data, URL history data, Cookie and bookmarks, which are the data in the work area 1601 are overwritten in the corresponding area of the system administrator's data 1603 in the retention area 1602 (step S1707).

Next, a history is stored in accordance with the browser access history setting (step S1708). More specifically, in a case where the browser access history described in FIG. 14 is ON, the URL history data in the work area 1601 is additionally stored in the URL history area 1604 of the retention area 1602. Meanwhile, in a case where the browser access history is OFF, the control proceeds to the next step.

In step S1709, the work area 1601 is all cleared (deleted). Then, log-out processing of the system administrator user is performed (step S1710). Herein, upon detecting a log-out of the system administrator, data in the work area 1601 is overwritten in the system administrator's data area 1603. Besides this, it is also possible to change the control to update the system administrator's data area 1603 at the time of data update in the work area 1601 in step S1705.

Described next is processing on a case where it is determined in step S1703 that a user is not a system administrator user. When it is determined in step S1703 that a user is not a system administrator user (No), data is not overwritten in the work area 1601 secured in step S1702 at the time of browser startup. In a case where the browser is operated and the temporary data, URL history data, Cookie and bookmarks are updated, respective data of the respective areas in the work area 1601 are updated (step S1711). For instance, as URL history data, an accessed URL, accessed date and time, an access user name and the like are stored.

Then, it is determined whether or not the user depresses on the browser display screen any of the end key 1215, the copy tab 901, the transmission/FAX tab 902, the box tab 903, or the tab 905 for other functions to end the browser (step S1712). When the browser ends (Yes), if the browser access history described in FIG. 14 is ON, the URL history data in the work area 1601 is additionally stored in the URL history area 1604 of the retention area 1602 (step S1713). Meanwhile, in a case where the browser access history is OFF, the control proceeds to the next step.

In step S1714, in a case where the automatic data clear upon browser ending described in FIG. 13 is ON, data stored in the work area 1601 is cleared (deleted) in accordance with the set values of items to be cleared. For instance, FIG. 13 shows the setting for clearing temporary data, URL history data, and Cookie, and not clearing bookmarks. Therefore, the temporary data, URL history data and Cookie data in the work area 1601 are cleared, while the bookmark area in the work area 1601 is retained. Meanwhile, in a case where the automatic data clear upon browser ending is OFF, data in the work area 1601 is retained without clearing.

In the present embodiment, the work area 1601 is secured in step S1702 after the browser is started in step S1701. Besides this, the control may be changed in a way that the work area 1601 is secured when the power of the digital copying machine 1001 is turned on and the controller unit 2000 is started. In this case, the system administrator's data 1603 may be overwritten in the work area 1601 when the system administrator user logs in.

Furthermore, in the present embodiment, although automatic data clear setting upon browser ending, items to be cleared, and browser access history setting are made on the operation unit 2012, these setting may be performed by using an application program operating on the client computer 1005 connected to the LAN 1006.

Furthermore, in the present embodiment, although a system administrator and users other than the system administrator are discriminated, it is also possible to allow a special user other than the system administrator to perform setting that can be executed by the system administrator.

Furthermore, in the present embodiment, only the browser access history is described as an example of data that can be browsed by the system administrator only. However, it is also possible to set in a way that another data such as temporary data can be browsed by the system administrator only. In this case, an area corresponding to the URL history area 1604 is provided for the temporary data in the construction described in the present embodiment.

As has been described above, according to the first embodiment, the user data clear method employed in the browser function is discriminated between a system administrator user and users other than the system administrator user. For instance, in a case of a system administrator user, system administrator's data used before can always be recovered when the browser is started. In comparison, in a case of a user other than the system administrator, automatic data clear upon browser ending is set in advance on the screen shown in FIG. 13. By virtue of this, data can automatically be cleared when the browser ends. Therefore, when a user other than the system administrator starts up the browser, it is possible to prevent recovery of the data used by a previous user.

Furthermore, according to the present embodiment, it is possible to select data to automatically be cleared in accordance with the contents set in advance in the setting of items to be cleared shown in FIG. 13. Furthermore, in the present embodiment, automatic data clear upon browser ending and items to be cleared shown in FIG. 13 can be set only by the system administrator user. Moreover, in the present embodiment, by designating activation of browser access history on the setting screen shown in FIG. 14 and by performing URL history clear setting in the clear items shown in FIG. 13, only the system administrator user can continuously refer to the accessed URL history.

In other words, according to the present invention, for a system administrator user, the previous setting can be recovered when the browser is started. On the contrary, for users other than the system administrator, it is possible to perform setting for designation of automatic data clear upon browser ending, and setting for items to be cleared and history acquisition. Accordingly, it is possible to preferably improve the system control function and security for an apparatus incorporating a browser function.

Furthermore, according to the present invention, data set by a user other than a system administrator can automatically be deleted upon browser ending. Therefore, it is possible to prevent a next user from erroneously using these data, thus achieving user's privacy protection and improved security.

Second Embodiment

Next, the second embodiment of the present invention is described. The construction of the system or the like according to the second embodiment is basically the same as the construction of the system or the like described in the first embodiment. For the part identical to the configuration of the first embodiment, the same reference numeral is assigned in the present embodiment, and the description of the first embodiment is appropriated for the second embodiment. Only the part different from the first embodiment will be described.

In the above-described first embodiment, users other than the system administrator are not specified to particular users, but users are simply discriminated between a system administrator user and other users. However, in the second embodiment, user authentication employing a department ID is performed.

Department management employing a department ID means to permit use of an apparatus by recognizing an individual using the apparatus or a department of the user, and to manage in units of department the setting of the usage upper limit, counting of the number of sheets used, collection of use fees and the like. In the department management, generally a department ID for identifying the department of an operator, and a password for identifying the operator are employed.

For instance, in a case of using a copying function of a copying machine, use of the machine is permitted after an operator inputs a department ID through a card or the like or on a screen of the operation unit 2012 upon start of the operation. When the number of sheets used exceeds the upper limit, use of the apparatus is rejected. Alternatively, use fees are collected in accordance with the number of sheets used. In view of this, to perform setting of the department ID management, the department ID management key 1202 on the screen shown in FIG. 12 is used to perform setting of whether or not the department ID management is to be activated, setting of a security code corresponding to a department ID, and setting of an upper limit value.

Figure 18:
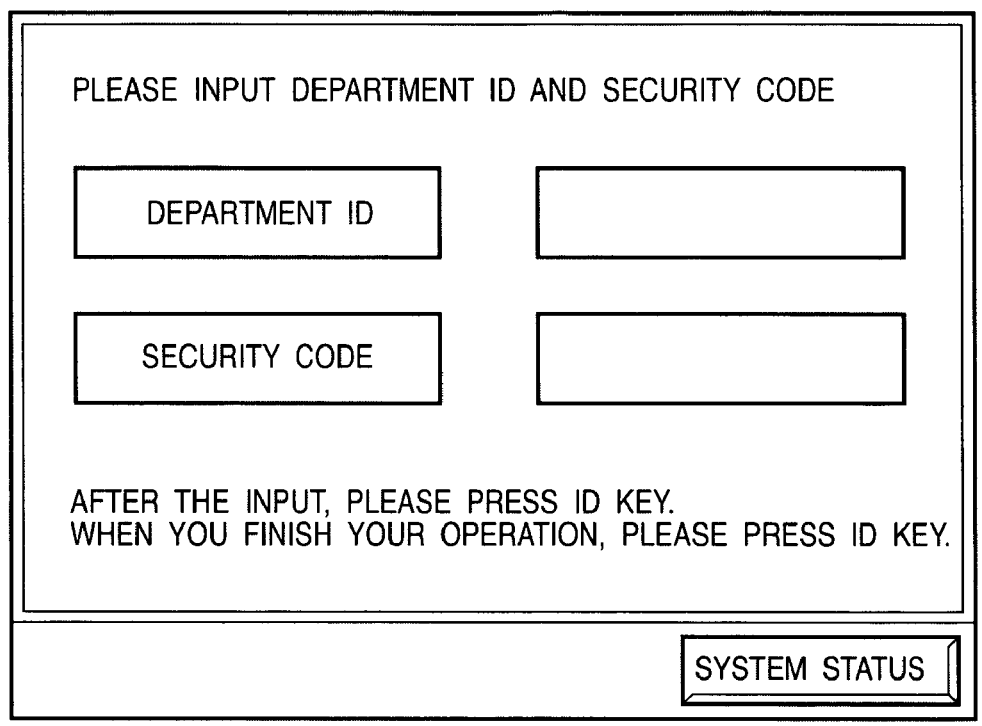
FIG. 18 is a view showing a screen for inputting a department ID and a security code.

When the department ID management is activated, a screen shown in FIG. 18 is displayed. FIG. 18 shows a screen for inputting a department ID and a security code. When a department ID and a password are inputted on the displayed screen shown in FIG. 18 and authentication is correctly performed, the browser function becomes available for use. When authentication fails, the browser function cannot be used. Meanwhile, when the department ID management is not activated, the browser function is available for use.

Figure 19:
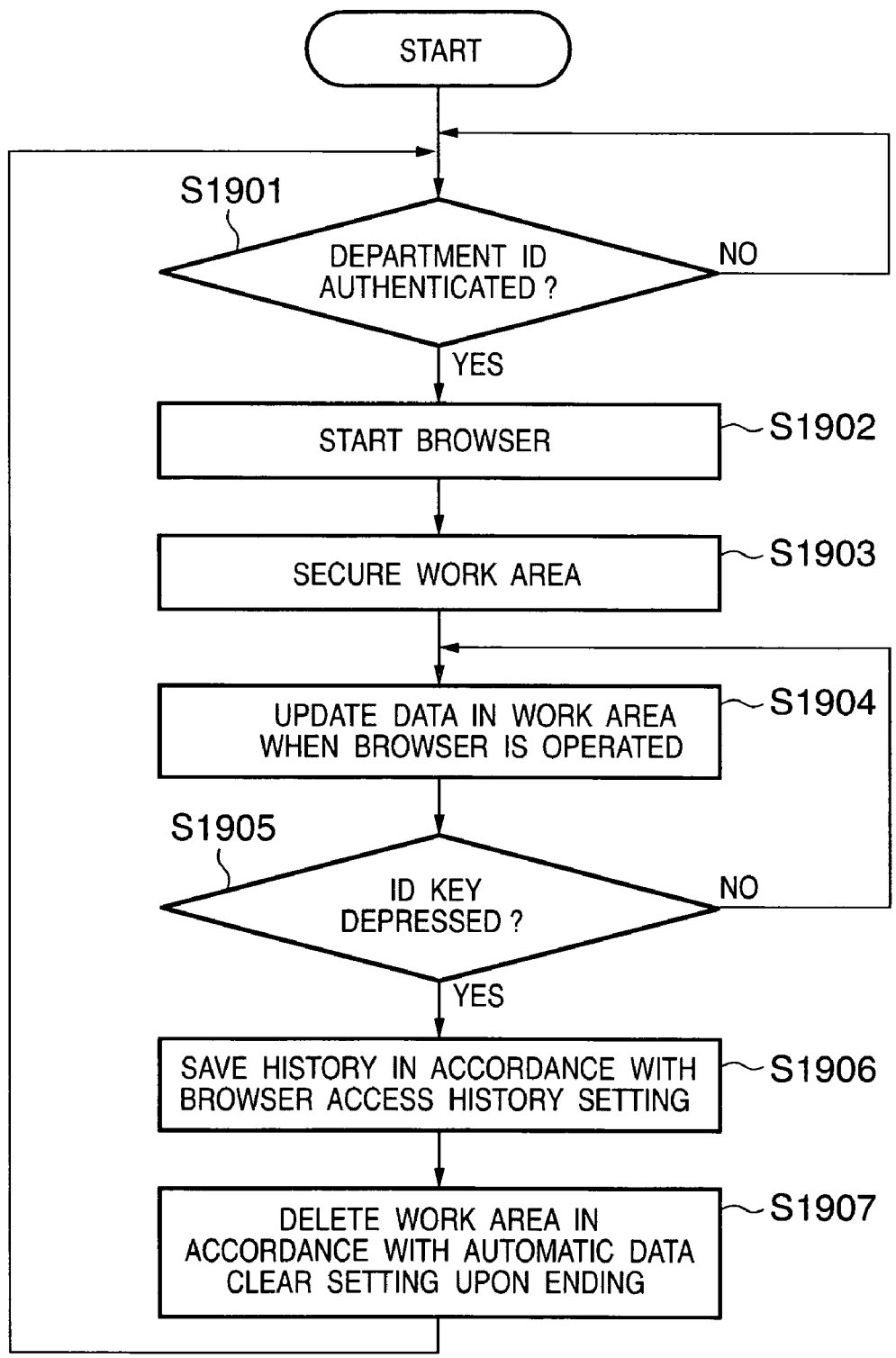
FIG. 19 is a flowchart describing processing for managing user data which is employed in browser displaying in a case where department ID management is activated according to the second embodiment.

FIG. 19 is a flowchart describing processing for managing user data which is employed in browser displaying in a case where department ID management is activated according to the second embodiment. First, it is determined whether or not the department ID authentication has correctly been performed on the screen shown in FIG. 18 (step S1901). In a case where authentication is correctly performed (Yes), use of the browser function becomes available, enabling depression of the browser function tab 904. In a case where authentication is not correctly performed, the browser function tab 904 is not activated.

When the browser tab 904 in the operation unit 2012 detects depression of the tab, the browser is started to begin the browser screen (step S1902). Next, a work area 1601 is secured in the RAM 2002 (step S1903). Note that the work area 1601 has the same construction as that of the first embodiment.

In the present embodiment, data is not overwritten in the work area 1601 secured in step S1903 at the time of browser startup. Meanwhile, in a case where the browser is operated and the temporary data, URL history data, Cookie and bookmarks are updated, respective data of the respective areas in the work area 1601 are updated (step S1904).

Next, it is determined whether or not the ID key 2016 on the operation unit 2012 is depressed to end the department ID management mode (step S1905). As a result, if it is determined that the ID key is depressed (Yes) and in a case where the browser access history described in FIG. 14 is ON, the URL history data in the work area 1601 is additionally stored in the URL history area 1604 of the retention area 1602 (step S1906). In this stage, a department ID number is recorded in the user name field of the browser access history. Note that in a case where the browser access history is OFF, the control proceeds to the next step.

In step S1907, in a case where the automatic data clear upon browser ending described in FIG. 13 is ON, data stored in the work area 1601 is cleared in accordance with the set values of items to be cleared. For instance, FIG. 13 shows the setting for clearing temporary data, URL history data, and Cookie, and not clearing bookmarks. Therefore, the temporary data, URL history data and Cookie data in the work area 1601 are cleared, while the bookmark area in the work area 1601 is retained. Meanwhile, in a case where the automatic data clear upon browser ending is OFF, data in the work area 1601 is retained without clearing.

After the processing in step S1907, the control returns to step S1901 to display the input screen of a department ID and a security code shown in FIG. 18, and waits for a next input.

Although the second embodiment describes department ID management as an example, the method described in the present embodiment can be applied to a user authentication form other than the department ID management.

As described above, according to the second embodiment, it is possible to automatically clear data at the time of ending the department ID mode. In other words, data set in the department ID mode is automatically deleted upon ending the mode. Therefore, it is possible to prevent a next browser user from erroneously using the data, thus achieving privacy protection and improved security.

Moreover, for a plurality of department IDs, user data employed in the browser does not require areas corresponding to each of the plurality of department IDs, but necessitates only one work area 1601. Therefore, it is possible to realize effective saving of the storage area.

Third Embodiment

Next, the third embodiment of the present invention is described. The construction of the system or the like according to the third embodiment is basically the same as the construction of the second embodiment. The third embodiment differs from the second embodiment only in the management method of user data employed in user displaying in a case where the department ID management is activated.

Figure 20:
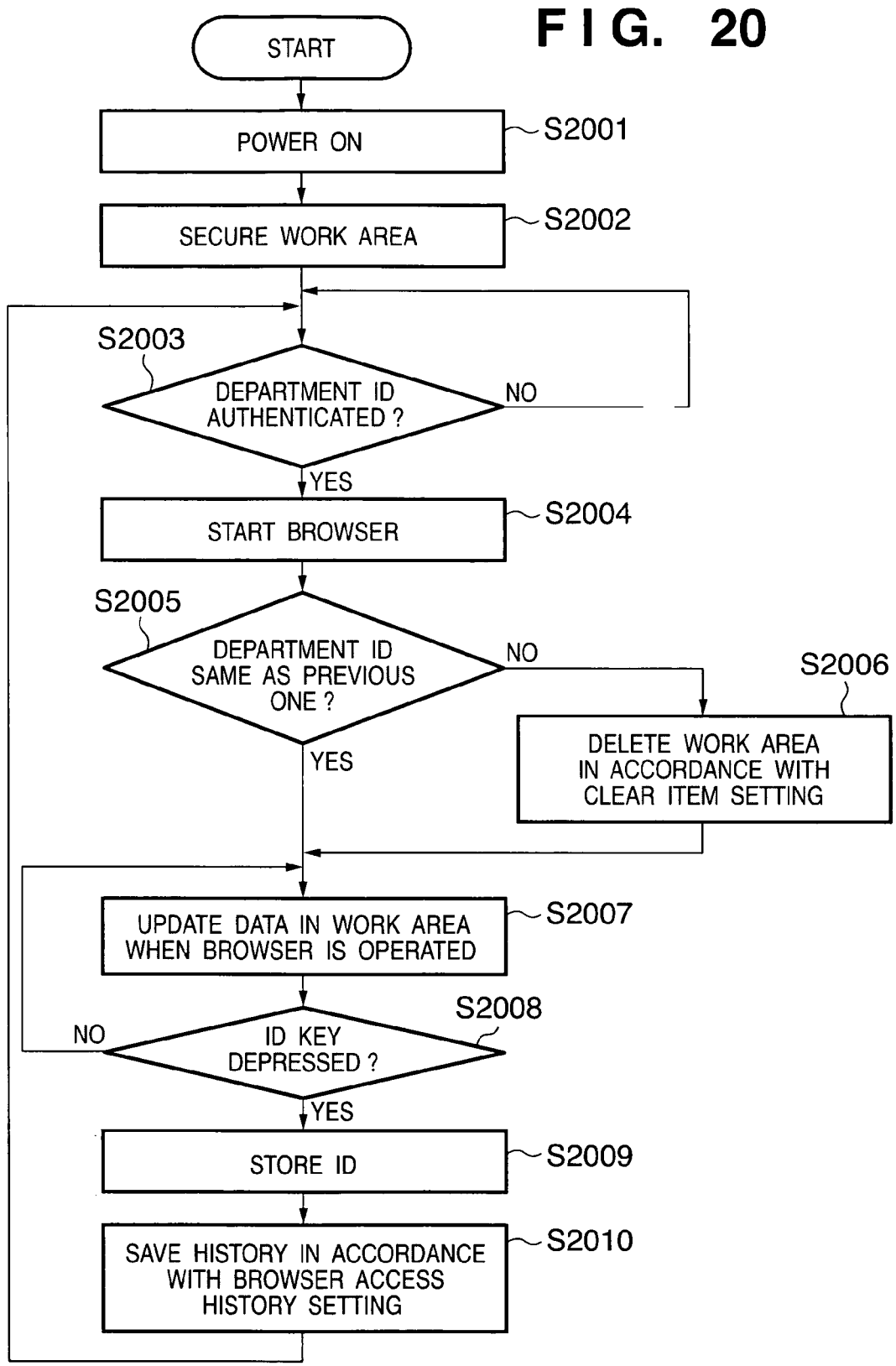
FIG. 20 is a flowchart describing processing for managing user data which is employed in browser displaying in a case where the department ID management is activated according to the third embodiment.

FIG. 20 is a flowchart describing processing for managing user data which is employed in browser displaying in a case where the department ID management is activated according to the third embodiment. First, the power of the copying machine 1001 is turned on (Power On) and the controller unit 2000 is started (step S2001). Then, a work area 1601 is secured in the RAM 2002 (step S2002). Note that the work area 1601 has the same construction as that of the first embodiment.

Next, it is determined whether or not the department ID inputted on the screen shown in FIG. 18 has correctly been authenticated (step S2003). As a result, in a case where authentication is correctly performed (Yes), use of the browser function becomes available, enabling depression of the browser function tab 904. In a case where authentication is not correctly performed, the browser function tab 904 is not activated.

Next, when the browser tab 904 in the operation unit 2012 detects depression of the tab, the browser is started to begin the browser screen (step S2004). Then, it is determined whether or not the user has the same department ID as the one used upon previous browser startup (step S2005). As a result, in a case where the department ID which has started the browser this time is different from the department ID which has previously started the browser (No), the control proceeds to step S2006.

In step S2006, in a case where the automatic data clear upon browser ending described in FIG. 13 is ON, data stored in the work area 1601 is cleared in accordance with the set values of items to be cleared. For instance, FIG. 13 shows the setting for clearing temporary data, URL history data, and Cookie, and not clearing bookmarks. Therefore, the temporary data, URL history data and Cookie data in the work area 1601 are cleared, while the bookmark area in the work area 1601 is retained. Meanwhile, in a case where the automatic data clear upon browser ending is OFF, data in the work area 1601 is retained without clearing.

Meanwhile, in step S2005, in a case where the department ID which has started the browser this time is the same number as the department ID which has previously started the browser (Yes), the work area 1601 is retained without clearing. Then, in a case where the browser is operated and the temporary data, URL history data, Cookie and bookmarks are updated, respective data of the respective areas in the work area 1601 are updated (step S2007).

Next, it is determined whether or not the ID key 2016 on the operation unit 2012 is depressed to end the department ID management mode (step S2008). As a result, if it is determined that the ID key 2016 is depressed to end the mode (Yes) and in a case where the browser access history described in FIG. 14 is ON, the URL history data in the work area 1601 is additionally stored in the URL history area 1604 of the retention area 1602 (step S2009).

In this stage, a department ID number is recorded in the user name field of the browser access history to be used in the next determination in step S2005 (step S2010). Thereafter, the control returns to step S2003 to display the input screen of a department ID and a security code shown in FIG. 18, and waits for a next input.

As described above, according to the third embodiment, it is possible to automatically clear data at the time of entering the department ID mode and starting up the browser. In this stage, the inputted department ID is compared with a department ID inputted at the previous browser startup to determine whether or not they are the same. The data is automatically cleared only when the IDs are different. Accordingly, for a user having the same department ID, the previously set data is retained, thus improving operability. For a user having a different department ID, data is cleared. Therefore, it is possible to realize reinforced security and improved privacy protection.

Fourth Embodiment

Next, the fourth embodiment of the present invention is described. The construction of the system or the like according to the fourth embodiment is basically the same as the construction of the first embodiment. The fourth embodiment can provide a method of managing user data employed in browser displaying in a case where an auto clear function is activated. Herein, the auto clear function is a function that returns the mode setting values of respective functions to initial values when the operation unit 2012 does not receive any user operation for a predetermined period.

Figure 21:
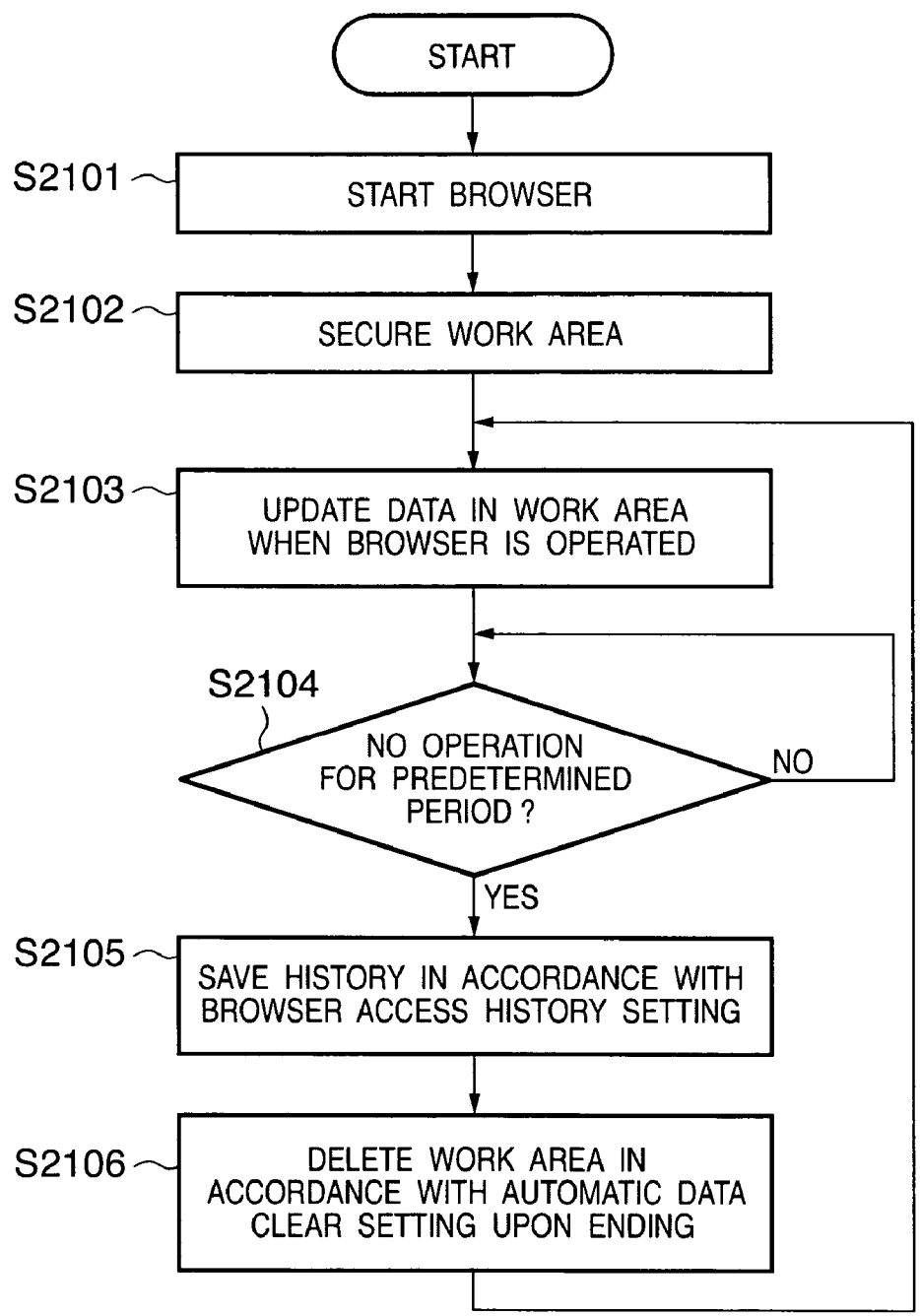
FIG. 21 is a flowchart describing processing for managing user data which is employed in browser displaying in a case where an auto clear function is activated according to the fourth embodiment.

FIG. 21 is a flowchart describing processing for managing user data which is employed in browser displaying in a case where the auto clear function is activated according to the fourth embodiment. First, when the browser tab 904 in the operation unit 2012 detects depression of the tab, the browser is started to begin the browser screen (step S2101). Next, a work area 1601 is secured in the RAM 2002 (step S2102). Note that the work area 1601 has the same construction as that of the first embodiment.

In a case where the browser is operated and the temporary data, URL history data, Cookie and bookmarks are updated, respective data of the respective areas in the work area 1601 are updated (step S2103). Next, it is determined whether the touch keys on the touch panel 2013 and hard keys 2014 to 2016 on the operation unit 2012 shown in FIG. 4 have not received a depression operation from a user for a predetermined period (step S2104). As a result, if no operation is performed for a predetermined period (Yes) and in a case where the browser access history described in FIG. 14 is ON, the URL history data in the work area 1601 is additionally stored in the URL history area 1604 of the retention area 1602 (step S2105).

Next, in step s2106, in a case where the automatic data clear upon browser ending described in FIG. 13 is ON, data stored in the work area 1601 is cleared in accordance with the set values of items to be cleared. For instance, FIG. 13 shows the setting for clearing temporary data, URL history data, and Cookie, and not clearing bookmarks. Therefore, the temporary data, URL history data and Cookie data in the work area 1601 are cleared, while the bookmark area in the work area 1601 is retained. Meanwhile, in a case where the automatic data clear upon browser ending is OFF, data in the work area 1601 is retained without clearing. After the processing in step S2106 ends, the control returns to step S2103 to repeat the above-described steps.

As described above, according to the fourth embodiment, in a case where it is determined that no operation has been received for a predetermined period, user data employed in the browser can automatically be cleared in synchronization with the auto clear function. Therefore, under the environment where the apparatus is available for unspecified numbers of users, even if the apparatus is left without any users' operation for a long time, the auto clear function works to clear the data for browsing, achieving privacy protection and improved security.

Other Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

Plural embodiments have been provided above for describing the best mode of the present invention. According to the present invention, in a case where a browser incorporated in an image processing apparatus, e.g., a digital multi-function copying machine, is used, management data and temporary data employed by a user are automatically cleared (deleted) upon ending the browser, except for a case of a special user. By virtue of this, it is possible to prevent a next user from erroneously using the data employed by the previous user, thus achieving privacy protection and improved security.

Furthermore, while previous setting is recovered for a system administrator user, users other than the system administrator can perform setting for designation of automatic data clear upon browser ending, and setting for items to be cleared and history acquisition. Accordingly, it is possible to improve the system control function and security for the apparatus.

Furthermore, the area in the system storing management data and temporary data is configured to come off with only one area even in a case where plural users use the apparatus. Therefore, it is possible to save the storage resource of the apparatus. Moreover, even if the apparatus is left for a long time in a state where the browser function is used, management data and temporary data can be cleared in synchronization with the auto clear function, thus achieving improved security.

According to the present invention, it is possible to improve security and reinforce privacy protection for cache data and management data generated when an operator employs a browser function, and also possible to efficiently utilize storage resources of the apparatus.

The present invention is not limited to the above embodiment and various changes and modifications can be made within the spirit and scope of the present invention. Therefore, to apprise the public of the scope of the present invention, the following claims are made.

What is claimed is:

1. An image processing apparatus having a web browser function, comprising:
   a storage unit, configured to store in a predetermined storage device data generated by a first operator employing the browser function;
   an end unit, configured to end employing of the browser function by the first operator, without deleting the generated data;
   an authentication unit, configured to authenticate a second an operator who employs the browser function;
   a determination unit, configured to determine whether or not the second operator succeeded in authentication by said authentication unit is the first an operator; and
   a control unit, configured to make the browser function usable to the second operator who succeeded in authentication by said authentication unit, but to delete the generated data, in a case where said determination unit determines that the second operator is not the first operator, and not to delete the generated data, in a case where said determination unit determines that the second operator is the first operator.

2. The image processing apparatus according to claim 1, wherein said storage unit, stores in a first storage device data generated by the first operator employing the browser function, and in a case where said determination unit determines that the first operator employing the browser function is a system administrator, said storage unit copies the data stored in the first storage device to a second storage device, and
   after the data is copied to the second storage device, said control unit deletes the data stored in the first storage device.

3. The image processing apparatus according to claim 2, wherein the second storage device stores in a first storage area URL data for enabling browsing of a content again that has been browsed by the system administrator using the browser function, and stores in a second storage area data other than the URL data generated when the system administrator uses the browser function, and
   after the URL data is copied from the first storage device to the first storage area of the second storage device and the data other than the URL data is copied from the first storage device to the second storage area of the second storage device, said control unit deletes data stored in the first storage device.

4. The image processing apparatus according to claim 3, further comprising a browsing unit, configured to perform browsing of a content based on data stored in the second storage device using the browser function,
wherein a content based on the URL data stored in the second storage area is permitted for browsing only by a system administrator.

5. The image processing apparatus according to claim 3, further comprising a permission unit, configured to permit whether or not to perform additional storage of the URL data to be copied from the first storage device to the first storage area of the second storage device,
wherein only in a case where said permission unit permits additional storage, said storage unit stores the URL data from the first storage device to the first storage area of the second storage device.

6. The image processing apparatus according to claim 2, wherein in a case where said determination unit determines at the time of browser startup or at the time of log-in to said apparatus that the first operator employing the browser function is a system administrator, said storage unit copies the data stored in the first storage device to the second storage device, and
said control unit deletes the data stored in the first storage device when the system administrator logs out.

7. The image processing apparatus according to claim 1, further comprising setting unit, configured to perform setting for whether or not the data stored in said storage unit is to be deleted,
wherein said control unit deletes the data in the storage device in a case where deletion of the data is set by said setting unit.

8. The image processing apparatus according to claim 1, wherein the data is management data for managing the browser function, and includes at least one of temporary data which is temporarily stored for displaying a content downloaded by the browser function, history data of URL accessed by using the browser function, Cookie data, and bookmark data.

9. The image processing apparatus according to claim 8, further comprising a selection unit, configured to select one or a plurality of data to be deleted from the data stored in said storage unit,
wherein said control unit deletes, from the data stored in the storage device, only data where deletion is set by being selected by said selection unit.

10. The image processing apparatus according to claim 1, wherein said authentication unit authenticates the second operator by using a department ID as an authentication ID, which is allocated to each department to which the second operator belongs.

11. The image processing apparatus according to claim 1, further comprising an auto clear unit, configured to clear various setting set in said apparatus and returns the setting to an initial setting state of said apparatus, in a case where it is determined that there is no use of the browser function by an operator for a predetermined period.

12. An image processing method of an image processing apparatus having a browser function, comprising:
a storage step, configured to store in a predetermined storage device data generated by a first operator employing the browser function;
an end step, configured to end employing of the browser function by the first operator, without deleting the generated data;
an authentication step, configured to authenticate a second operator who employs the browser function;
a determination step, configured to determine whether or not the second operator succeeded in authentication by said authentication unit is the first operator; and
a control step, configured to make the browser function usable to the second operator who succeeded in authentication by said authentication unit, but to delete the generated data, in a case where said determination unit determines that the second operator is not the first operator, and not to delete the generated data, in a case where said determination unit determines that the second operator is the first operator.

13. A program for causing a computer having a browser function to execute:
a storage procedure, configured to store in a predetermined storage device data generated by a first operator employing the browser function;
an end procedure, configured to end employing of the browser function by the first operator, without deleting the generated data;
an authentication procedure, configured to authenticate a second an operator who employs the browser function;
a determination procedure, configured to determine whether or not the second operator succeeded in authentication by said authentication unit is the first an operator who last employed the browser function; and
a control procedure, configured to make the browser function usable to the second operator who succeeded in authentication by said authentication unit, but to delete the generated data, in a case where said determination unit determines that the second operator is not the first operator, and not to delete the generated data, in a case where said determination unit determines that the second operator is the first operator.

* * * * *